US006855287B1

United States Patent
Anzai

(10) Patent No.: US 6,855,287 B1
(45) Date of Patent: Feb. 15, 2005

(54) METHOD OF MANUFACTURING FLEXIBLE RESIN HOSE

(75) Inventor: Michio Anzai, Yokohama (JP)

(73) Assignee: Piolax, Inc., Kanagawa-ken (JP)

( * ) Notice: Subject to any disclaimer, the term of this patent is extended or adjusted under 35 U.S.C. 154(b) by 0 days.

(21) Appl. No.: 09/720,839

(22) PCT Filed: May 1, 2000

(86) PCT No.: PCT/JP00/02882

§ 371 (c)(1),
(2), (4) Date: Dec. 29, 2000

(87) PCT Pub. No.: WO00/66344

PCT Pub. Date: Nov. 9, 2000

(30) Foreign Application Priority Data

Apr. 30, 1999 (JP) .............................. 11-123424
Jan. 27, 2000 (JP) ....................... 2000-018369

(51) Int. Cl.[7] .............................................. B29C 53/30
(52) U.S. Cl. ...................... 264/506; 264/507; 264/570; 264/573
(58) Field of Search ............................... 264/506, 507, 264/570, 573, 504, 505

(56) References Cited

U.S. PATENT DOCUMENTS

| 3,992,505 A | | 11/1976 | Tally ............................ 264/295 |
| 4,428,900 A | * | 1/1984 | Riley et al. .................. 264/526 |
| 4,499,045 A | * | 2/1985 | Obsomer ...................... 264/532 |
| 6,287,508 B1 | * | 9/2001 | Stripe ........................... 264/570 |

FOREIGN PATENT DOCUMENTS

| EP | 0039377 A1 | 11/1981 |
| EP | 0693359 A1 | 1/1996 |
| JP | 59059417 | 4/1984 |
| JP | 61084223 | 4/1986 |
| JP | 03065329 | 3/1991 |
| JP | 03019822 | 7/1994 |
| JP | 03065330 | 12/1994 |
| JP | 63247020 | 10/1995 |

* cited by examiner

Primary Examiner—Suzanne E. McDowell
(74) Attorney, Agent, or Firm—Howard & Howard

(57) ABSTRACT

A hose 20 made of thermoplastic resin is heated by flowing high temperature such as vapor into the hose, the flow of the high temperature fluid is restricted downstream of he hose to pressurize an interior of the hose. The hose heated in this manner is bent by bending jigs 51 and 52. Lastly, cold temperature fluid such as water is allowed to flow into the hose to cool and harden the hose, thereby producing a flexion resin hose. Alternatively, the hose is formed with a corrugated portion having uneven characteristics in its circumferential direction with respect to tensile strength in the axial direction. High temperature and high pressure fluid is allowed to flow into the hose to heat and pressurize the hose, thereby bending the corrugated portion by an internal pressure. Then, cold temperature fluid is allowed to flow into the hose to cool and harden the hose, thereby producing the flexion resin hose. It is possible to heat, bend and cool the hose in a short cycle with high precision, and it is possible to provide a method for producing a flexion resin hose having excellent productivity.

9 Claims, 25 Drawing Sheets

FIG.10
(a)
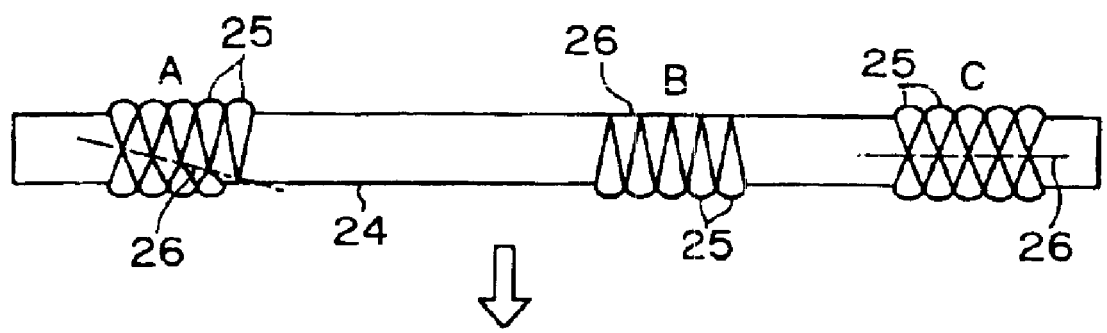
(b)
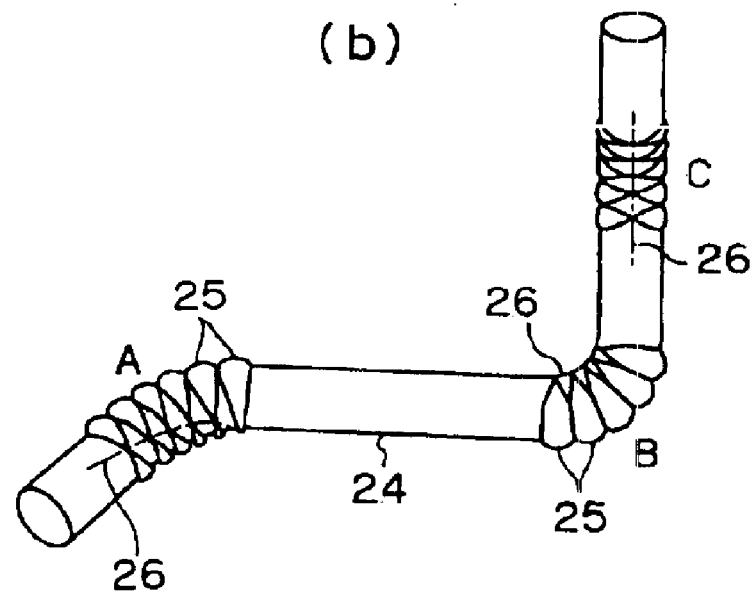

FIG.14
(a)
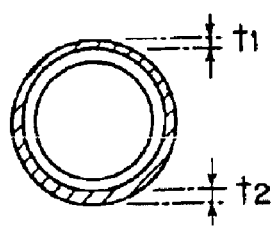
(b)
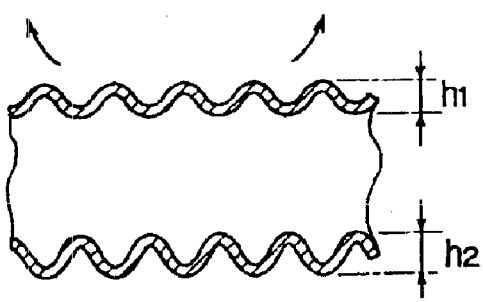
(c)
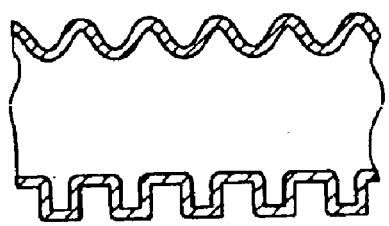
(c')
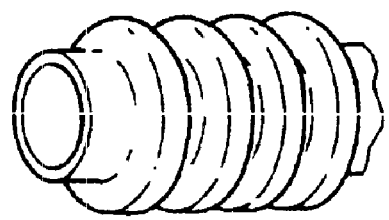
(d)
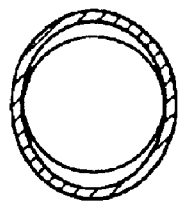
(d')
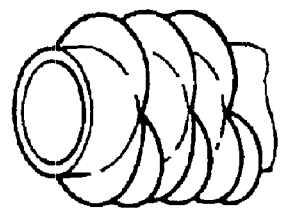
(e)
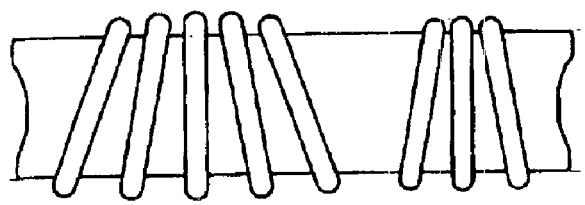

FIG.18
(a)
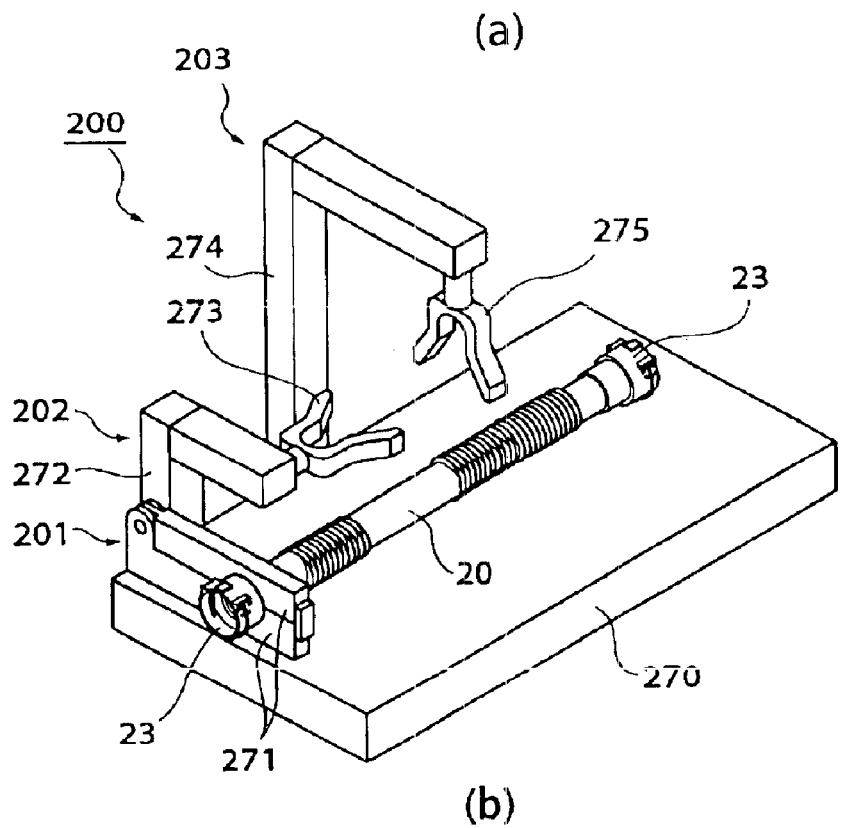
(b)
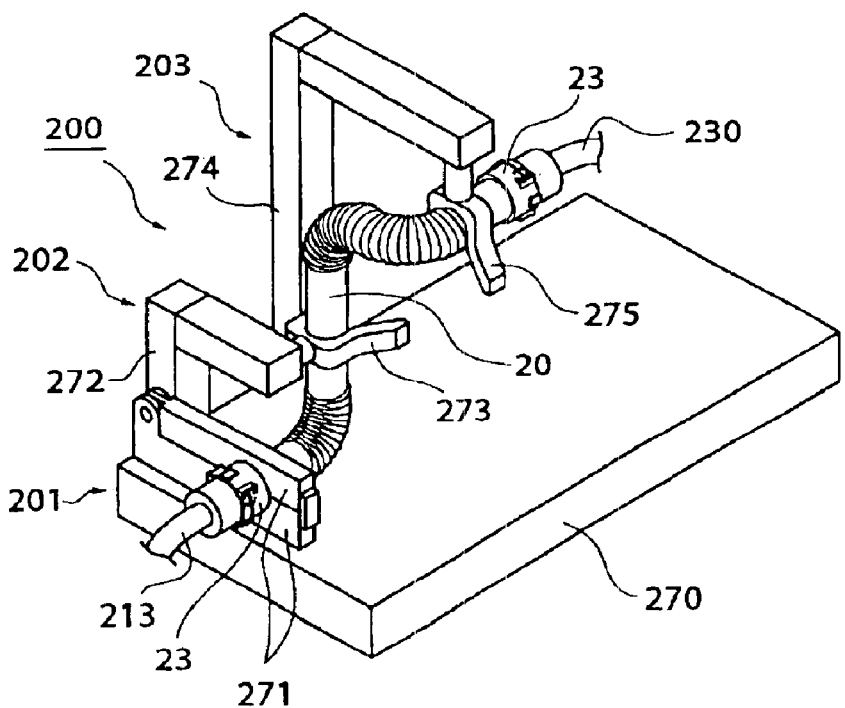

METHOD OF MANUFACTURING FLEXIBLE RESIN HOSE

TECHNICAL FIELD

The present invention relates to a method for producing a flexion resin hose made of thermoplastic resin suitable for a radiator hose for an automobile for example.

BACKGROUND ART

Conventionally, a rubber hose is generally used as a radiator hose for an automobile. This is because that the rubber hose can freely be bent depending upon layout of an engine or a radiator, and the rubber hose can absorb relative displacement between the engine and the radiator caused by vibration during driving of the automobile.

However, the rubber hose is heavy in weight and handling thereof is inferior, and there is a problem that when the rubber hose is connected to a pipe of the engine or the radiator, it is necessary to clamp the hose using a hose clamp, and the mounting workability is inferior.

On the other hand, a hose made of thermoplastic resin is known. There is a known hose in which a cross section of the hose along its axial direction is formed with a waveform uneven corrugated portion so as to provided the hose with flexibility.

Such a resin hose is light in weight as compared with the rubber hose and handling thereof is superior. Further, the resin hose can previously be provided at its end with a joint portion that can be connected to the pipe of the engine or the radiator with a single motion and thus, there is a merit that the mounting workability is superior. However, since the resin hose is inferior in flexion ability to the rubber hose, it is preferable that the resin hose is previously bent into a predetermined shape in accordance with a place to be mounted.

As a bending method of a hose made of thermoplastic resin, Japanese Patent Publication No. H6-55431, e.g., discloses a method for producing a resin deformed pipe in which a helical spring having an outer diameter substantially equal to an inner diameter of a curved resin pipe is inserted and disposed into the resin pipe over its entire length, the resin pipe is mounted to a jig provided with an arc guide portion that is downwardly curved with a predetermined radius of curvature such that the resin pipe is hung between opposite ends of the guide portion, the jig to which the resin pipe is mounted is immersed in hot water, the resin pipe that is heated by the hot water and softened and bent downward by its own weight and weight of the helical spring is supported by the guide portion, and the resin pipe supported by the guide portion in the curved state it taken out from the hot water together with the jig, and in this state, the resin pipe is cooled and hardened.

Japanese Patent Publication No. H7-96261 discloses a bending method of a synthetic resin pipe in which opposite ends of the synthetic resin pipe are fixed to a clamp disposed on a base, the synthetic resin pipe is heated and softened, a screw rod is allowed to project from a bracket projected sideway from an upper surface of the base, the screw rod pushes an outer surface of the synthetic resin pipe through a resilient body connected to the screw rod, thereby bending the pipe through a desired angle. In this case, it is described that heated air is blown into the synthetic resin pipe, a current is allowed to flow through a heating sheet wound around the synthetic resin pipe to heat the synthetic resin pipe.

Further, Japanese Patent Publication No. H6-104336 discloses a method for producing a thermoplastic resin pipe having a partition that is integrally formed therein with a partition wall along its axial direction in which in a bending method of the pipe, the pipe body is heated from outside of a peripheral wall of the pipe to such a temperature that only the peripheral wall of the pipe can be deformed, the pipe having the partition is accommodated into a divided outer mold that is curved to a predetermined degree, the pipe is curved while introducing pressure fluid into the pipe body and then, the pipe is cooled and taken out.

However, in any of Japanese Patent Publication Nos. H6-55431, H7-96261 and H6-104336, there is a problem that it takes time to heat the resin hose, and if an attempt is made to heat and bend the pipe within a short time, the pipe can not be heated sufficiently and the thickness or shape of the pipe can not be precisely determined. Further, it also takes time to cool the pipe after it was bent, and there is a problem that if the cooling time is shortened and the pipe is taken out from the mold in its insufficiently cooled state, the shape of the pipe is returned to the original shape.

Therefore, it is an object of the present invention to provide a method for producing a flexion resin hose having excellent productivity capable of heating, bending and cooling the hose within a short cycle.

DISCLOSURE OF INVENTION

To achieve the above object, a first invention provides a method for producing a flexion resin hose, comprising a step for allowing high temperature fluid to flow into a hose made of thermoplastic resin to heat the hose, a step for bending the heated hose, and a step for allowing cold temperature fluid into the hose to cool and harden the hose.

According to the first invention, it is possible to heat the hose within a short time by flowing the high temperature fluid into the hose. It is possible to cool and harden the hose within a short time by flowing the cold temperature fluid into the hose after the hose was bent. Therefore, a flexion resin hose can be produced with excellent productivity and with high precision.

A second invention provides a method for producing a flexion resin hose, comprising a step for allowing high temperature fluid to flow into a hose made of thermoplastic resin to heat the hose, a step for restricting the flow of the high temperature fluid downstream of the hose to pressurize an interior of the hose, a step for bending the heated hose, and a step for allowing cold temperature fluid into the hose to cool and harden the hose.

According to the second invention, the buckling of the hose when it is bent can be prevented and the hose can be bent such while keeping its cross section close to circular not only by heating the hose by the high temperature fluid, but also by pressurizing the interior of the hose.

In the second invention, the hose may be gradually be bent by repeating, a plurality of times, the step for allowing high temperature fluid to flow into the hose made of thermoplastic resin to heat the hose, the step for restricting the flow of the high temperature fluid downstream of the hose to pressurize an interior of the hose, and the step for bending the heated hose. By bending the hose in stepwisely, it is possible to prevent the buckling of the bent portion of the hose more effectively.

A third invention provides a method for producing a flexion resin hose according to the first or second invention in which the hose is bent while blowing cooling fluid onto a neutral line along a bent portion of the hose.

According to the third invention, by blowing the cooling fluid onto the neutral line along the bent portion of the hose, i.e., onto a peripheral wall on an intermediate portion between inside and outside of the bent portion (opposite sides of the bent portion), rigidity of that portion is enhanced, and the buckling at the time of bending operation can be prevented more effectively.

A fourth invention provides a method for producing a flexion resin hose in which the hose is made of thermoplastic resin, the hose is provided at its one portion in its axial direction with a corrugated portion, the corrugated portion has uneven characteristics in its circumferential direction with respect to tensile strength in an axial direction thereof, the method comprising a heating and pressurizing step for allowing high temperature and high pressure fluid into the hose to heat and pressurize the hose and for bending the corrugated portion of the hose by an internal pressure, and a cooling step for allowing cold temperature fluid into the hose to cool and harden the hose.

According to the fourth invention, if the high temperature and high pressure fluid is allowed to flow into the hose and the hose is heated and pressurized, the corrugated portion tends to extend in the axial direction, but since the corrugated portion has uneven characteristics in the circumferential direction with respect to the tensile strength in the axial direction, the axial extension becomes uneven in the circumferential direction and as a result, the hose is bent. Therefore, the hose can be bent only by flowing the high temperature and high pressure through the hose by heating and pressurizing the hose without using a mold or jig to forcibly bend the hose. After the hose was bent into a predetermined shape, if the cold temperature fluid is allowed to flow through the hose, the hose can be cooled and hardened swiftly.

A fifth invention provides a method for producing a flexion resin hose according to the fourth invention in which the hose is held by first and second holding tools located at a predetermined distance from each other, and the heating and pressurizing step and the cooling step are carried out in a state in which at least one of the first and second holding tools can be displaced with respect to the other one.

According to the fifth invention, when the high temperature and high pressure is allowed to flow through the hose to bend the corrugated portion, if the hose is held by the first and second holding tools and at least one of the tools is displaced with respect to the other tool, a predetermined restricting force is provided against deformation of the hose and thus, it is easy to constantly form the hose.

A sixth invention provides a method for producing a flexion resin hose according to the fourth or fifth invention in which the hose is formed at its plurality of portions in its axial direction with corrugated portions, an uneven characteristic in the circumferential direction of the corrugated portion is determined for each of the corrugated portions.

According to the sixth invention, by allowing the high temperature and high-pressure to flow through the hose, the corrugated portion of the hose are respectively bent in predetermined positions by the uneven characteristics in the circumferential direction, it is possible to easily produce, with a single operation, a hose having two or three dimensional shape that is bent at a plurality of portions.

A seventh invention provides a method for producing a flexion resin hose according to any one of the first to sixth inventions in which the high temperature fluid is vapor, and the cold temperature fluid is water.

According to the seventh invention, vapor and water have excellent thermal conductivity as compared with hot wind or cold wind and thus, it is possible to heat and cool the hose within a short time. Therefore, it is possible to enhance the working precision and productivity, and cleaning effect in the hose by vapor and water can be expected.

An eighth invention provides a method for producing a flexion resin hose according to any one of the fourth to seventh inventions in which the heating and pressurizing step is carried out using an internal pressure of 80 to 90% of hoop stress.

According to the eighth invention, by heating and pressurizing the hose with internal pressure of 80 to 90% of the hoop stress of the hose, it is possible to bent the hose swiftly and to form the hose with excellent workability, and it is possible to obtain a flexion resin hose that is less prone to be deformed even in an environment where the hose is used.

A ninth invention provides a method for producing a flexion resin hose according to any one of the fourth to eighth inventions in which the heating and pressurizing step is carried out at a temperature higher than a temperature in an environment where the hose is used.

According to the ninth invention, it is possible to obtain a flexion resin hose that is less prone to be deformed even in an environment where the hose is used.

A tenth invention provides a method for producing a flexion resin hose according to any one of the fourth to ninth inventions in which the hose is made of polyamide, and the heating and pressurizing step is carried out at 130 to 140° C. and 2.7 to 3.7 atmospheric pressure.

According to the tenth invention, it is possible to provide heating and pressurizing condition which are most suitable when a hose made of polyamide is worked, it is possible to bent the hose swiftly, and to obtain a flexion resin hose that is less prone to be deformed even in an environment where the hose is used.

An eleventh invention provides a method for producing a flexion resin hose according to any one of the fourth to ninth inventions in which the hose is made of polypropylene, and the heating and pressurizing step is carried out at 110 to 130° C. and 2.2 to 3.0 atmospheric pressure.

According to the eleventh invention, it is possible to provide heating and pressurizing condition which are most suitable when a hose made of polypropylene is worked, it is possible to bent the hose swiftly, and to obtain a flexion resin hose that is less prone to be deformed even in an environment where the hose is used.

When the fourth to eleventh inventions are carried out, as means for restricting a bending shape of the hose to some degree to uniform the formed shape when the hose is heated an pressurized, various holding means can be employed. Examples of such holding means are: 1) a method in which a waiting jig for receiving the hose to restrict the bending is provided on a path to which the hose is bent; 2) a method in which the waiting jig is disposed on a position where the jig does not hinder the bending action or operation at an initial stage, and when the hose is heated and pressurized, the jig is moved to a predetermined position; 3) a method in which a movable jig for pressing the hose when the hose is bent and enters into the waiting jig is provided to prevent the hose from returning in the cooling step; 4) a method in which a plurality of corrugated portions having uneven characteristics in the circumferential direction with respect to the tensile strength in the axial direction are provided, and each corrugated portion is provided with the holding jig; 5) a method in which the waiting jig is formed into U- or V-shape so that the hose can easily enter; 6) a method in which the holding jig comprises a holder detachably mounted to an outer periphery of the hose and a wire for pulling the holder, and when the hose is heated and pressurized, the wire is pulled to move the holder to a predetermined position; 7) a method in which when the hose is heated and pressurized, the pose is pressed by an all-surface mold having a fitting portion formed along an expected bent shape is provided, the hose is held by the holding jig; 8) a robot arm is brought into a free state at an initial stage, and when the hose was heated and pressurized, the holding jig is moved to the predetermined position by the robot arm; 9) a method in which the robot arm is provided with a holding jig, it does not hold at an initial stage, and when it is heated and pressurized it grasps the hose at a predetermined timing to forcibly move the hose to a predetermined position.

According to each of the 1) to 9) methods, when the hose is heated and pressurized, the hose is not prevented from being bent by itself at least at an initial state, and at a final stage, the bend shape of the hose is restricted, thereby constantly form the shape. Further, it is possible to prevent the hose from returning at the cooling step, and to form into a stable shape having no variation by holding the hose by the holding jig.

BRIEF DESCRIPTION OF DRAWINGS

FIG. 10 show another embodiment of the invention, wherein (a) is a view for explaining the hose before it is bent, and (b) is a view for explaining the bent hose;

FIG. 14 are views for explaining various examples of corrugated portions having circumferentially uneven characteristics with respect to tensile strength in its axial direction;

FIG. 18 is a perspective view showing a concrete structure of holding and molding means used for the bending apparatus;

BEST MODE FOR CARRYING OUT THE INVENTION

Figure 1:
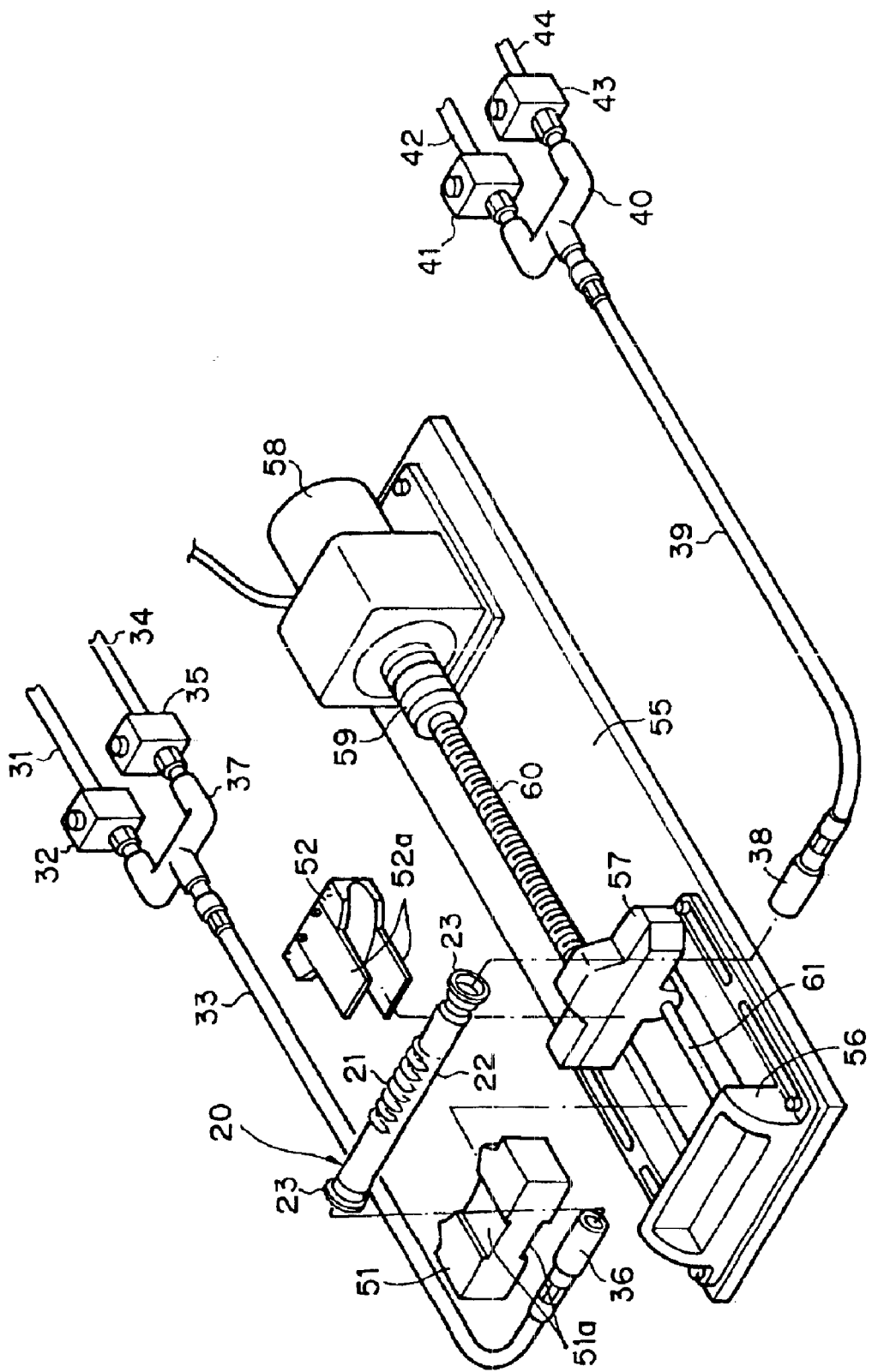
FIG. 1 is a perspective view showing pipes for vapor and water, a bending jig and a hose as one example of a producing apparatus used in the present invention.
Figure 2:
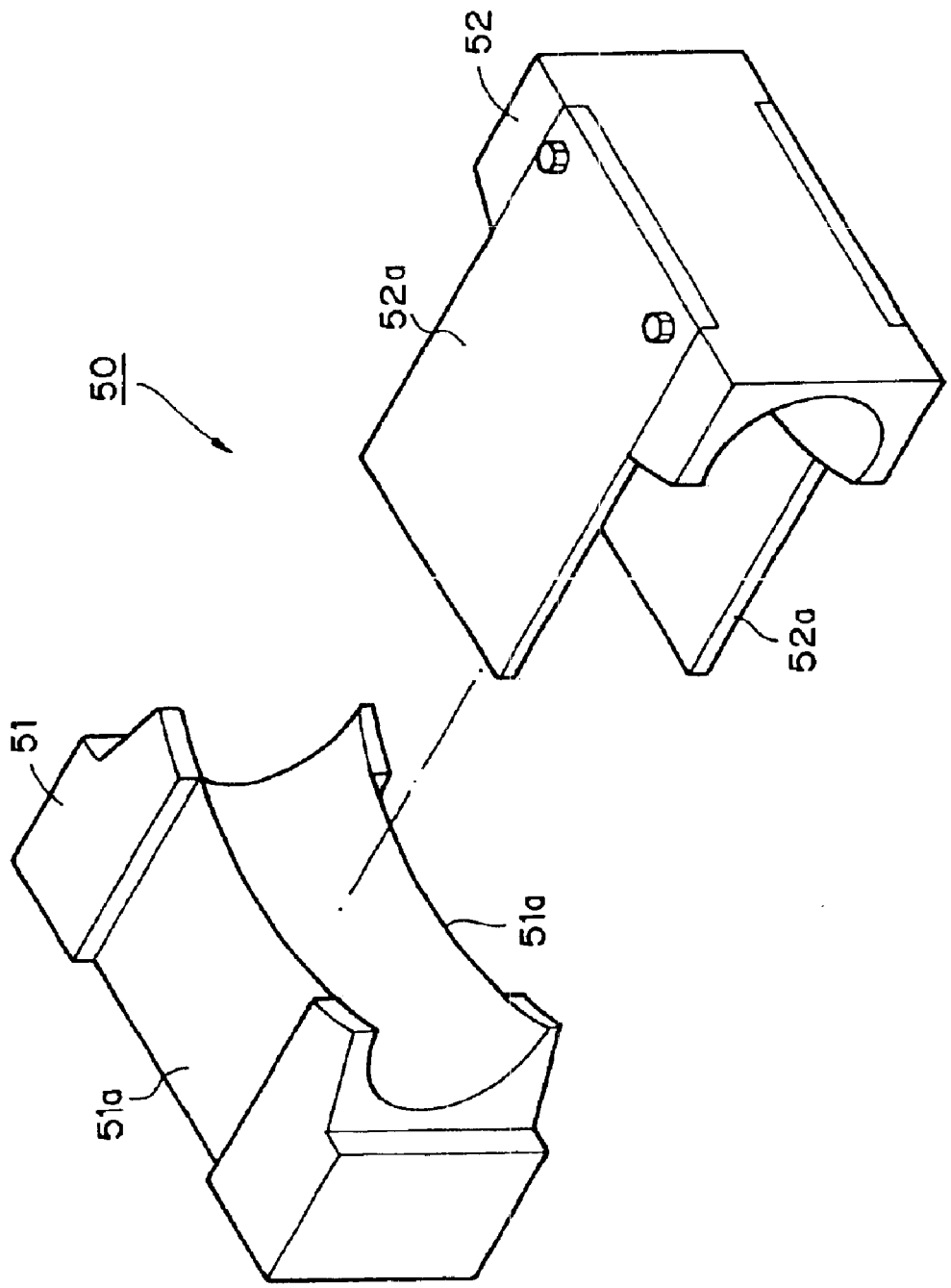
FIG. 2 is an enlarged perspective view showing the opened bending jig in the producing method.
Figure 3:
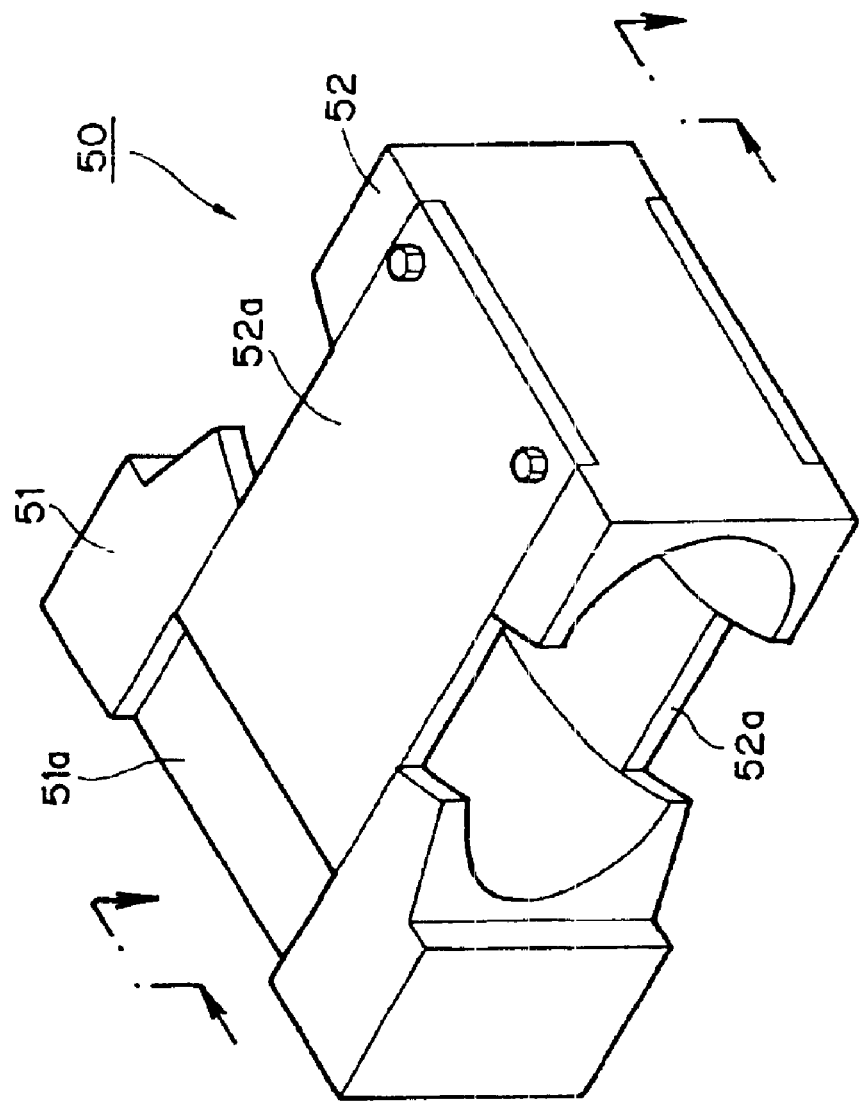
FIG. 3 is an enlarged perspective view showing the closed bending jig in the producing method.
Figure 4:
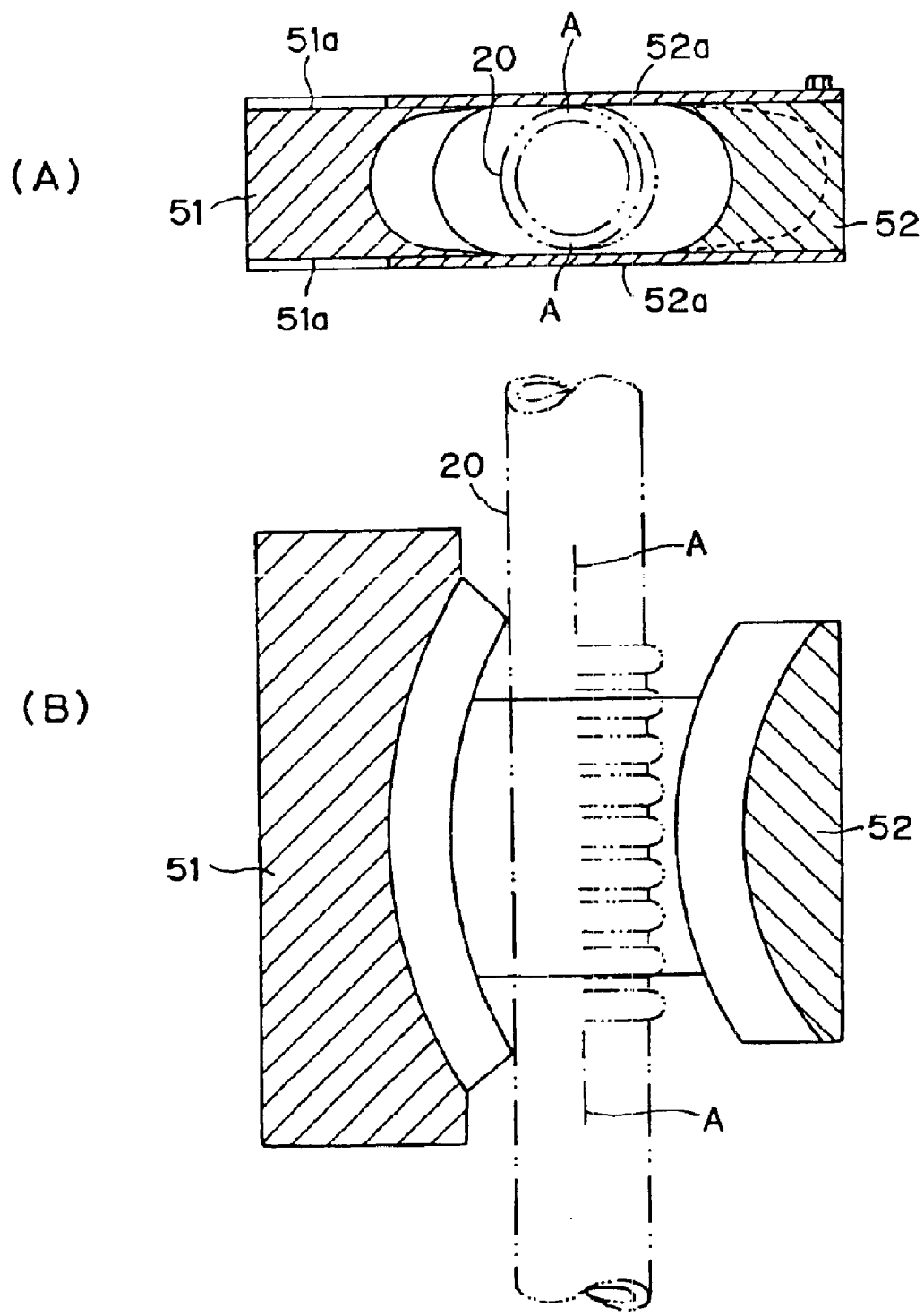
FIG. 4 are sectional views the hose sandwiched by the bending jig.

FIGS. 1 to 5 show one example of a producing apparatus used for producing a flexion resin hose according to the present invention. FIG. 1 is a perspective view showing pipes for vapor and water, a bending jig and a hose as one example of a producing apparatus used in the present invention; FIG. 2 is an enlarged perspective view showing the opened bending jig in the producing method, FIG. 3 is an enlarged perspective view showing the closed bending jig in the producing method, FIG. 4 are sectional views the hose sandwiched by the bending jig, and FIG. 5 views for explaining producing process of a flexion resin hose.

Figure 5:
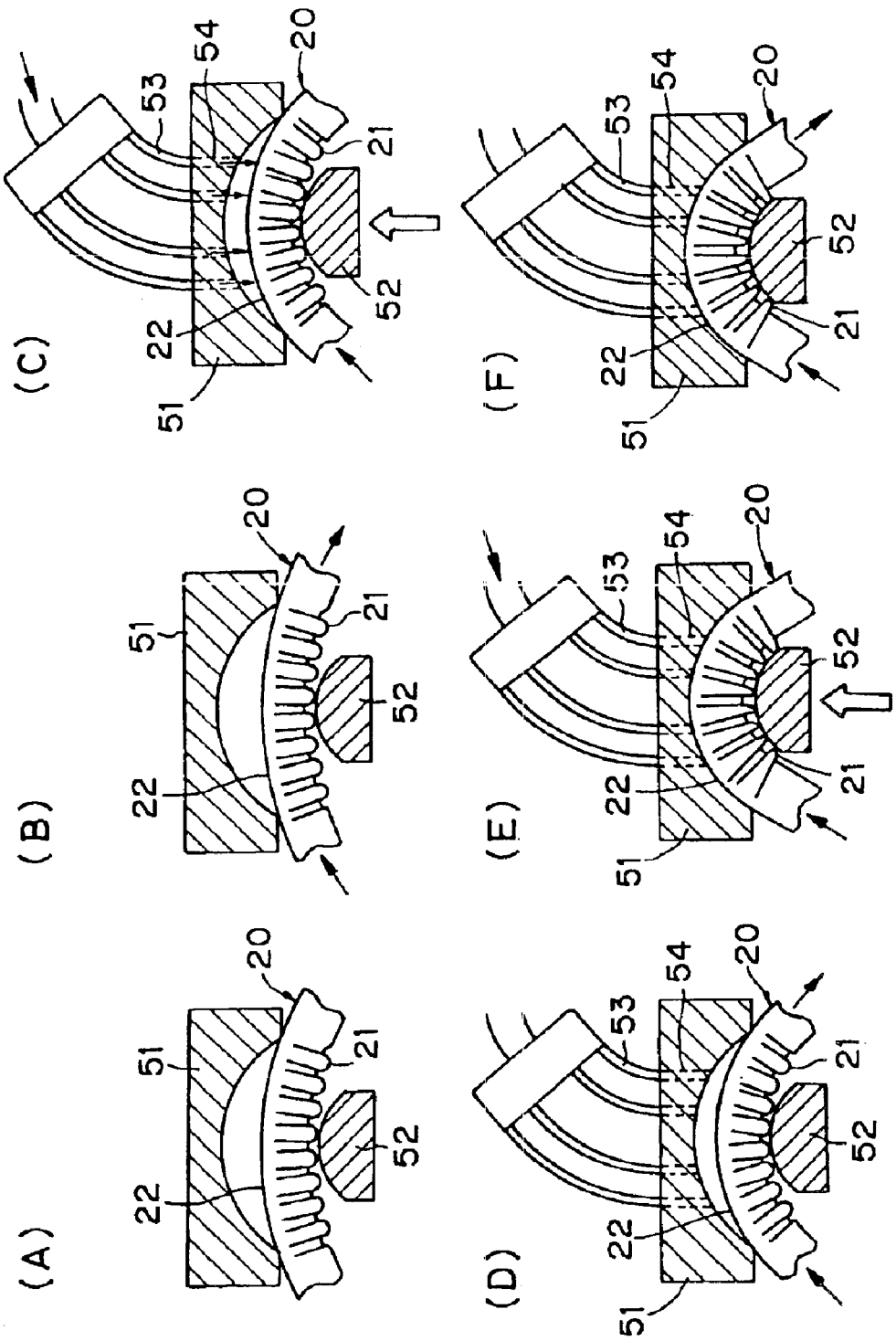
FIG. 5 views for explaining producing process of a flexion resin hose.

A resin hose 20 that is to be bent is produced in such a manner that thermoplastic resin such as polyamide, polyacetal and polypropylene is used as a material and it is extruded into a pipe-like shape by a common method and then, the extruded material is sandwiched by a mold provided at its inner surface with waveform uneven portions is blow-molded. The resin hose 20 is provided at its axially central portion with a corrugated portion 21. A cross section of the corrugated portion 21 along its axial direction is of a waveform uneven shape, the uneven portion is formed only around a half of the circumference in cross section along a circumferential direction thereof and a peripheral wall portion opposed to the corrugated portion 21 is formed as a flat portion 22. In this embodiment, as shown in FIG. 5, the corrugated portion 21 of the resin hose 20 is bent inward, and the flat portion 22 opposed thereto is bent outward.

As shown in FIG. 1, adapters 23 and 23 which can be connected to pipes of a radiator and an engine with a single motion are mounted to opposite ends of the resin hose 20. The adapters 23 and 23 can be mounted by inserting then into the opposite ends of the resin hose 20 and heat sealed or bonded after the resin hose 20 was molded. Various structures can be employed for the adapters 23 and 23, but since this is not the feature of the present invention, explanation thereof is omitted here.

In FIG. 1, a reference number 31 represents a vapor supply pipe that is connected to a fluid supply pipe 33 through a first open/close valve 32 and a converging pipe 37. A reference number 34 represents a water supply pipe that is connected to the fluid supply pipe 33 through a second open/close valve 35 and the converging pipe 37. A tip end of the fluid supply pipe 33 is formed as a joint portion 36 detachably connected to the adapter 23 on one end of the resin hose 20.

The adapter 23 on the other end of the resin hose 20 is detachably connected to a joint portion 38 provided on a base end of a fluid discharging pipe 39. A tip end of the fluid discharging pipe 39 is connected to a base end of a branch pipe 40, one branch branching from the branch pipe 40 is connected to a vapor discharging pipe 42 through a third open/close valve 41, and the other branch branching from the branch pipe 40 is connected to a water discharging pipe 44 through a fourth open/close valve 43.

Referring to FIGS. 2 to 4, a bending jig 50 comprises a pair of members, i.e., a stationary-side jig 51 and a movable-side jig 52. In this example, the stationary-side jig 51 has an inner surface shape along an outer periphery of a bent portion, and the movable-side jig 52 has an inner surface shape along an inner periphery of the bent portion. The stationary-side jig 51 is formed at its upper and lower surfaces with guide grooves 51a, and the movable-side jig 52 is formed at its upper and lower surfaces with guide pieces 52a to be inserted into the guide grooves 51a. The guide pieces 52a prevent the hose 20 from coming out from the jig 50, pushes neutral lines A (opposite sides of the bent portion along a curve line of the hose 20 when the resin hose 20 is bent, thereby preventing the resin hose 20 from buckling.

Although it is not illustrated in FIGS. 1 to 4, cold air supplying pipes 53 are connected to the stationary-side jig 51 as shown in FIG. 5, so that cold air is blown to a portion near the neutral lines A (opposite sides of the bent portion) of the resin hose 20 through passages 54 that are passing through the stationary-side jig 51 and opened toward the opposite sides of the resin hose 20.

As shown in FIG. 1, the stationary-side jig 51 of the bending jig 50 abuts against a stationary support portion 56 of a base 55, and the movable-side jig 52 abuts against a pusher 57 in a state in which the movable-side jig 52 is opposed to the stationary-side jig 51. The pusher 57 moves forward and backward with respect to the stationary support portion 56 by a motor 58, a nut 59 mounted to a driving shaft of the motor 58, and a ball screw 60 whose one end is threadedly engaged with the nut 59 and whose other end is connected to the pusher 57. A reference number 61 represents a guide rod for moving the pusher 57.

One embodiment of the producing method of the flexion resin hose according to the present invention using the above-described producing apparatus will be explained.

First, as shown in FIG. 1, the joint portion 36 is connected to the fluid supply pipe 33 to the adapter 23 on the one end of the resin hose 20, and the joint portion 38 of the fluid discharging pipe 39 is connected to the adapter 23 on the other end. At that time, the open/close valves 32, 35, 42 and 32 are all closed.

As shown in FIGS. 4(A), (B) and FIG. 5(A), the corrugated portion 21 of the resin hose 20 is directed toward the movable-side jig 52, the resin hose 20 is sandwiched between the stationary-side jig 51 and the movable-side jig 52, and the guide pieces 52a of the movable-side jig 52 are inserted into the guide grooves 51a of the stationary-side jig 51. In this state, the bending jig 50 is disposed between the stationary support portion 56 and the pusher 57 of the base 55. In this case, the stationary-side jig 51 is brought into abutment against the stationary support portion 56, and the movable-side jig 52 is brought into abutment against the pusher 57.

Next, the first open/close valve 32 and the third open/close valve 41 are opened, and as shown in FIG. 5(B), high temperature vapor is introduced into the resin hose 20 through the vapor supply pipe 31, the first open/close valve 32, the converging pipe 37 and the fluid supply pipe 33. After the high temperature vapor was allowed to pass through the resin hose 20, the vapor is discharged through the fluid discharging pipe 39, the branch pipe 40, the third open/close valve 41 and the vapor discharging pipe 42. A preferable temperature of the vapor is 120 to 150° C., and it is preferable that the resin hose 20 is heated to 100 to 140° C. by the vapor. If the heating temperature is lower than this value, it is difficult to bend the resin hose 20 with high workability, and if the temperature is higher than the above value, the resin hose 20 is prone to be deformed such as buckling.

In this state, as shown in FIG. 5(C), the third open/close valve 41 is closed, a high temperature vapor is introduced into the resin hose 20 under pressure to increase the pressure in the resin hose 20. A preferable pressure at that time is 2 to 5 kg/cm². If the internal pressure is lower than this value, a buckling preventing effect at the time of bending can not sufficiently be obtained, and if the pressure is higher than the above value, the high temperature vapor may leak and handling is inferior.

Next, the motor 58 is actuated to push out the pusher 57, thereby moving the movable-side jig 52 toward the stationary-side jig 51 by a predetermined length. As shown in FIG. 5(C), the resin hose 20 is bent halfway. At the time of bending operation, cold air is blown to the neutral lines A (opposite sides of the bent portion, see FIG. 4) along the curve of the resin hose 20, thereby cooling and hardening the wall portion on the neutral lines A to enhance the rigidity of that portion, and the resin hose 20 is prevented from buckling flatly. Also by bringing the guide pieces 52a of the movable-side jig 52 into abutment against the opposite sides of the resin hose 20, the buckling preventing effect can be enhanced.

After the resin hose 20 was bent halfway, the third open/close valve 41 is again opened. As shown in FIG. 5(D), high temperature vapor as that mentioned above is allowed to pass into the resin hose 20 to again heat the resin hose 20. At that time, the blowing of cold air by the cold air supplying pipes 53 is temporarily stopped.

Further, the third open/close valve 41 is again closed, the high temperature vapor is introduced into the resin hose 20 under pressure to increase the pressure in the resin hose 20. In this state, the motor 58 is again actuated to push out the pusher 57, the movable-side jig 52 is moved toward the stationary-side jig 51 again. As shown in FIG. 5(E), the resin hose 20 is bent until it comes in tight contact with an inner surfaces of the movable-side jig 52 and the stationary-side jig 51. At that time, the resin hose 20 is prevented from buckling by blowing cold air to the neutral lines A (opposite side of the bent portion) of the resin hose 20 through the cold air supplying pipes 53 and the passages 54 as in the same manner as that described above.

After the bending operation was completed, the first open/close valve 32 is closed to stop the supply of vapor, the third open/close valve 41 is opened to discharge the high temperature vapor in the resin hose 20 and then, the third open/close valve 41 is closed. Further, the second open/close valve 35 and the fourth open/close valve 43 are opened, water is introduced into the resin hose 20 as shown in FIG. 5(F) through the water supply pipe 34, the second open/close valve 35, the converging pipe 37 and the fluid supply pipe 33. After the water was allowed to pass through the resin hose 20, the water is discharged through the fluid discharging pipe 39, the branch pipe 40, the fourth open/close valve 43 and the water discharging pipe 44. It is preferable that a temperature of the water is 30° C. or lower, and with this temperature, a temperature of the resin hose 20 itself can be cooled down to 30 to 40° C.

The resin hose 20 that has been bent in this manner is cooled and hardened and then, the motor 58 is driven reversely to retreat the pusher 57, the bending jig 50 is taken out from between the stationary support portion 56 and the pusher 57. The stationary-side jig 51 and the movable-side jig 52 are opened, and the resin hose 20 sandwiched therebetween is taken out. The adapters 23 and 23 on the opposite ends of the resin hose 20 are detached from the joint portions 36 and 38, and the bent resin hose 20 can be obtained.

In the above embodiment, various shape and structure can be employed for the corrugated portion 21 of the resin hose 20, and the resin hose 20 may not have the corrugated portion 21. The bending operation shown in FIGS. 5(B), (C), (D) and (E) may be carried out in two stages as shown in the embodiment, or may be carried out gradually in three or more stages, or the hose may be bent to a target angle in one stage. When buckling is not generated in the resin hose 20 so much, the pressure in the resin hose 20 need not be increased and cold air may not be blows to the neutral lines A of the resin hose 20 at the time of bending operation. As the high temperature fluid, the vapor is most preferable, and water is most preferable as the cold fluid, but other fluid can be employed.

Figure 6:
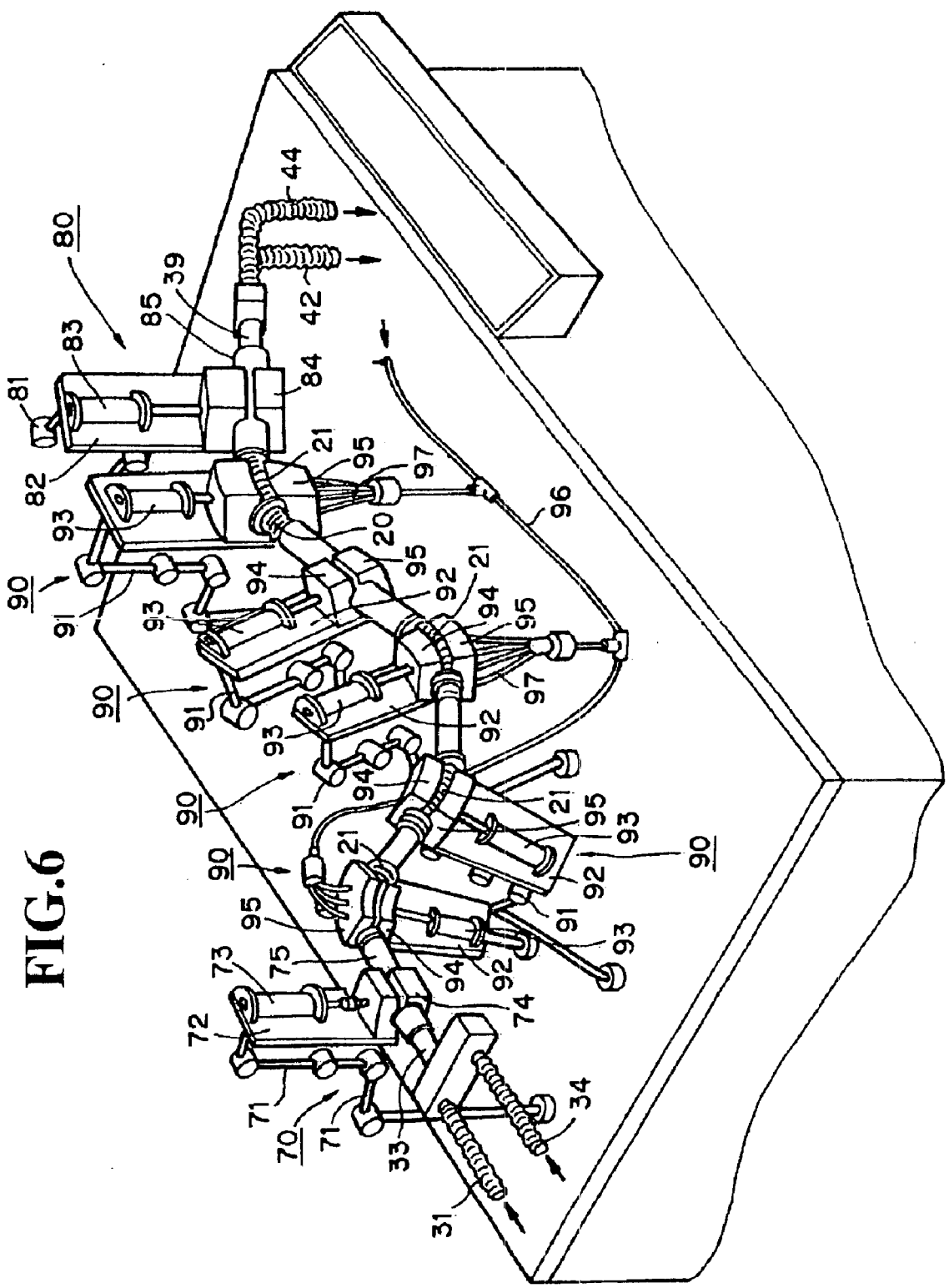
FIG. 6 is a perspective view showing another embodiment of the producing apparatus used in the invention.

FIG. 6 shows another example of the producing apparatus that is applied to the producing method of the flexion resin hose according to the present invention. Members similar to those of the producing apparatus of the previous embodiment are designated by the same reference numerals, and explanation thereof is omitted.

The producing apparatus comprises a first connecting apparatus 70 for connecting one end of the resin hose 20 to the fluid supply pipe 33, and a second connecting apparatus 80 for connecting the other end of the resin hose 20 to the fluid discharging pipe 39. The connecting apparatuses 70 and 80 respectively comprise substrates 72 and 82 supported through universal joints 71 and 81, air cylinders 73 and 83 mounted to the substrates 72 and 82, clamps 74 and 84 opened and closed by the air cylinders 73 and 83, and connection pipes 75 and 85 to be put on connected outer peripheries between the ends of the resin hose 20 and the fluid supply pipe 33 and the fluid discharging pipe 39. The connection pipes 75 and 85 are put on the connected outer peripheries between the ends of the resin hose 20 and the fluid supply pipe 33 and the fluid discharging pipe 39, the connection pipes 75 and 85 are sandwiched by the clamps 74 and 84 by the operation of the air cylinders 73 and 83, thereby detachably connecting and supporting the resin hose 20.

The resin hose 20 is formed with a plurality of corrugated portions 21 along the axial direction. A plurality of bending apparatuses 90 for bending the resin hose 20 are disposed in the corrugated portions 21. Each of the bending apparatuses 90 includes a substrate 92 supported through a universal joint 91, an air cylinder 93 mounted to the substrate 92, and a pair of bending jigs 94 and 95 which are opened and closed by the air cylinder 93. A plurality of cold air supply pipes 97 branched from a compressed air supply pipe 96 is connected to any one of the bending jigs 94 and 95, so that cold air injected from the cold air supply pipes 97 is blown to the neutral lines A (opposite sides of the bent portion) along the curve of the resin hose 20.

Since the bending operation of the resin hose 20 is substantially the same as that of the previous embodiment, explanation thereof is omitted. In this embodiment, since the bending apparatuses 90 are disposed at plurality of locations of the resin hose 20, a plurality of portions of the resin hose 20 can be bent simultaneously and as a result, a resin hose 20 bent at a plurality of portions can be produced with high productivity. In this case, the resin hose 20 is heated and cooled by flowing high temperature vapor or relatively cold water through the resin hose 20. Therefore, the entire resin hose 20 can be heated and cooled instantaneously.

Figure 7:
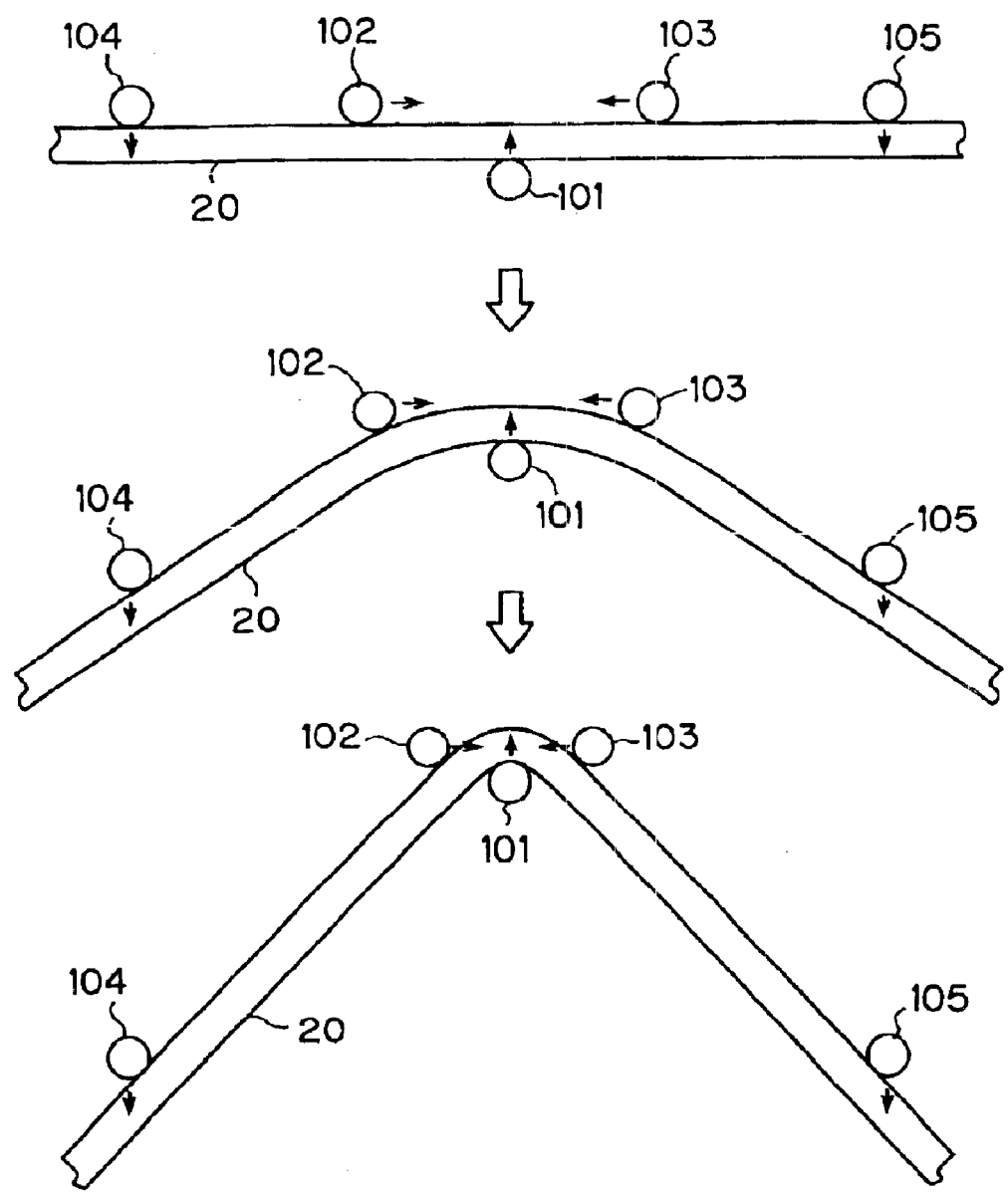
FIG. 7 is a view for explaining another example of the bending jig used in the invention.

FIG. 7 shows another embodiment of the bending jig.

The bending jig comprises a plurality of rollers 101 to 105 abutting against the resin hose 20. The roller 101 disposed at a center of the inner side of the bent portion relatively moves upward as shown in the drawing. The pair of rollers 102 and 103 disposed such as to be opposed from each other while slightly separating from the center on the outer side of the bent portion relatively move such as to approach each other. The pair of rollers 104 and 105 disposed on the outer side of the bent portion at a further distance from the center relatively move downward.

By flowing high temperature fluid such as vapor into the resin hose 20 to heat the latter, thereby moving the rollers 101 to 105 as described above in this state, the resin hose 20 is bent gradually at great angle with a small radius of curvature as shown in FIG. 7. Therefore, by adjusting the moving amounts of the rollers 101 to 105, it is possible to bend the resin hose 20 at a desired angle and with a desired radius of curvature without using a plurality of kinds of jigs. In this state, lastly, the resin hose 20 can be cooled and hardened by flowing cooling fluid such as water into the resin hose 20. The rollers 104 and 105 prevents the bent resin hose 20 from returning to its original shape.

Figure 8:
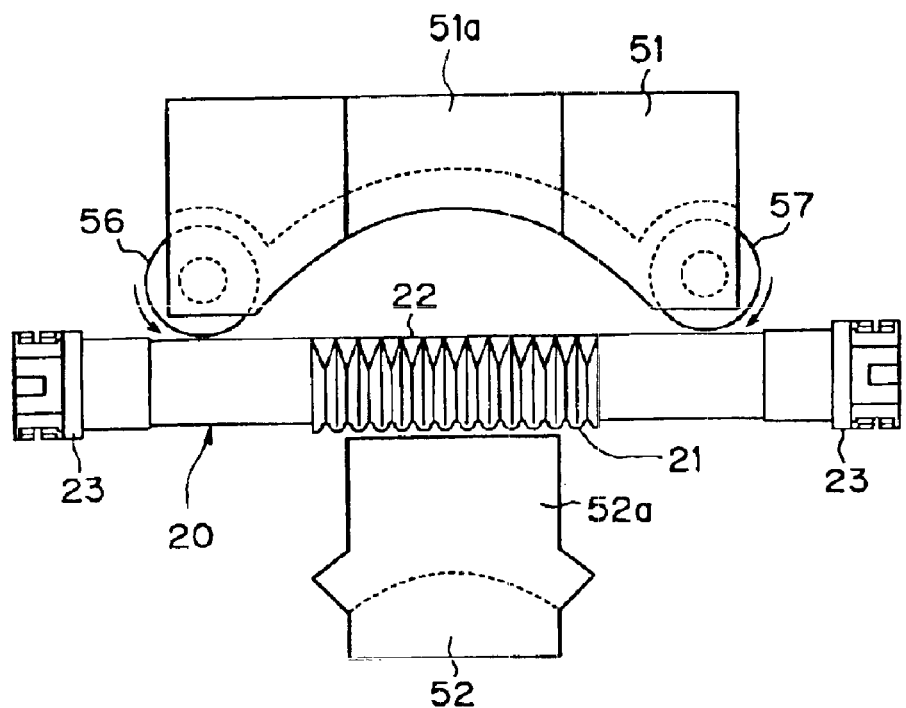
FIG. 8 is a plan view of the hose before it is bent for showing another example of the bending jig used in the invention.
Figure 9:
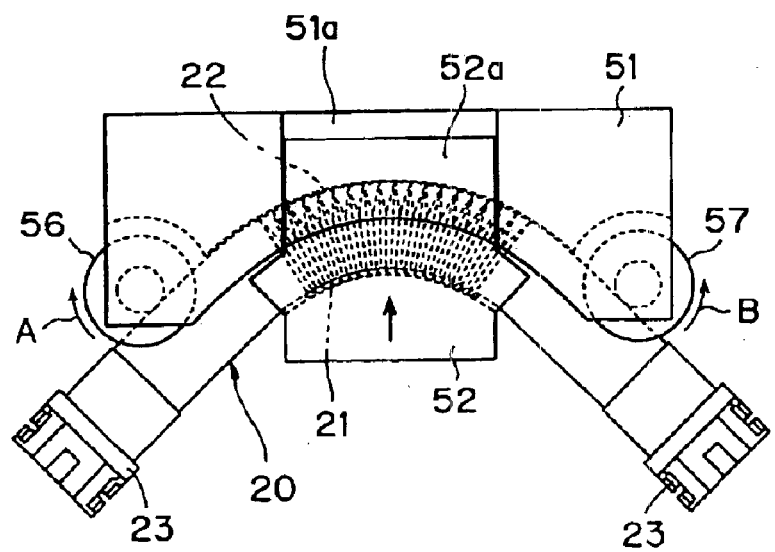
FIG. 9 is a plan view showing the hose bent by the bending jig.

FIGS. 8 and 9 show another embodiment of the bent jig.

Since this bending jig has basically the same structure of that shown in FIGS. 2 to 4, members similar to those of the producing apparatus of the previous embodiment are designated by the same reference numerals, and explanation thereof is omitted. This bending jig is different from the former one in that a pair of rollers 56 and 57 are mounted to opposite sides of the stationary-side jig 51. As a result, if the hose 20 is sandwiched between the stationary-side jig 51 and the movable-side jig 52 to push the movable-side jig as shown in FIG. 9, the rollers 56 and 57 of the stationary-side jig 51 are rotated as shown with arrows A and B in FIG. 9 and thus, the hose 20 can be introduced into between the jigs 56 and 57.

Figure 11:
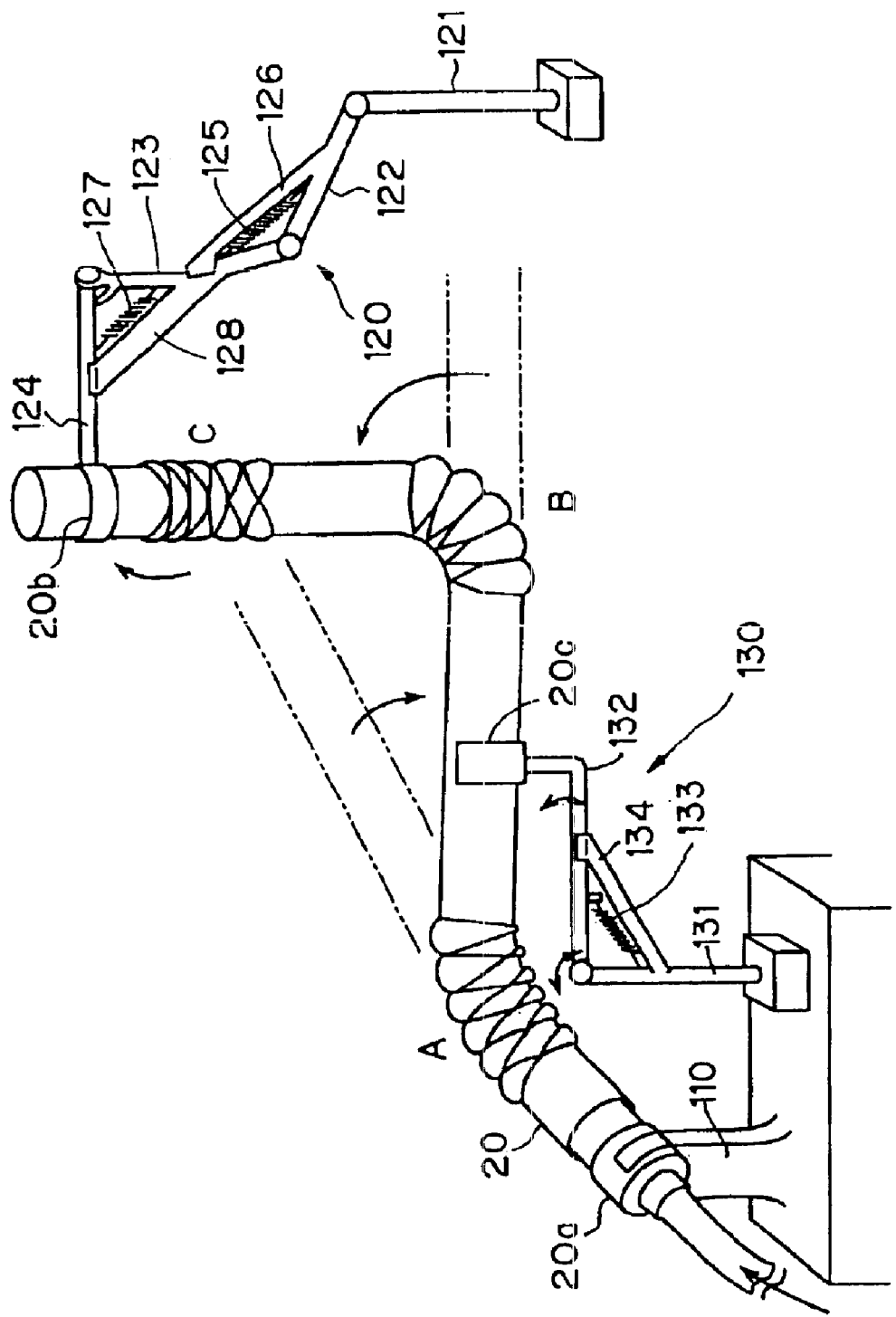
FIG. 11 is a perspective view showing the hose supported in heating and pressurizing step in the embodiment.

FIGS. 10 and 11 show another embodiment of the producing method of the flexion resin hose. FIG. 10(a) is an explanatory view of a straight state showing one example of a hose applied to the producing method, FIG. 10(b) is an explanatory view showing a state in which the hose is bent, and FIG. 11 is an explanatory view showing a state in which the hose is bent by a supporting tool.

As shown in FIG. 10(a), a hose 24 applied to this method includes three corrugated portions A, B and C along its axial direction. Each of the corrugated portions A, B and C has an uneven portion 25 shaped into a waveform when the corrugated portion is cut along the axial direction. Bumps of the uneven portion 25 becomes gradually lower toward a portion thereof in its circumferential direction, and flat portions 26 is formed on the low bumps. Since the uneven portion 25 is displaced in the circumferential direction in this manner, the corrugated portions A, B and C has uneven characteristics in the circumferential direction with respect to the tensile strength in the axial direction.

In the corrugated portion A, a line connecting the flat portions 26 to one another is formed such as to draw a helical line. In the corrugated portion B, a line connecting the flat portions 26 to one another is formed straightly along an upper portion of the hose 24 shown in FIG. 10(a). In the corrugated portion C, a line connecting the flat portions 26 to one another is formed straightly along an intermediate portion of the hose 24 in FIG. 10(a). The axial tensile strength of this line connecting the flat portions 26 to one another in is high with respect to a portion where the uneven portion 25 is formed.

If high temperature and high pressure fluid, e.g., high temperature and high pressure vapor is introduced into the hose 20, the hose 20 is bent such that the line connecting the flat portions 26 in each of the corrugated portions A, B and C comes inside as shown in FIG. 10(b). As a result, the corrugated portion A is bent such that it is twisted helically, the corrugated portion B is bent upward as viewed in the drawing, and the corrugated portion C is bent such as to rise in the perpendicular direction with respect to the paper sheet of FIG. 10.

Before the hose 20 is heated and pressurized, one end 20a of the hose 20 is fixed and supported by a fixing and supporting tool 110 as shown in FIG. 11.

The other end 20b of the hose 20 is supported by a movable supporting tool 120 comprising four links 121, 122, 123 and 124 connected to one another. An extension spring 125 is interposed between the links 122 and 123 to bias these links in a direction to bend these links, and a rod-like stopper 126 is extended in Y-shape from the link 122 for restricting a bending angle of the links 122 and 123 when the extension spring 125 acts to bend the links 122 and 123. Similarly, an extension spring 127 is interposed between the links 123 and 124 to bias these links in a direction to bend these links, and a rod-like stopper 128 is extended in Y-shape from the link 123 for restricting a bending angle of the links 123 and 124 when the extension spring 127 acts to bend the links 123 and 124.

An intermediate portion 20c of the hose 20 is supported by a movable supporting tool 130 comprising two links 131 and 132. An extension spring 133 is interposed between the links 131 and 132 to bias these links in a direction to bend these links, and a rod-like stopper 134 is extended in Y-shape from the link 131 for restricting a bending angle of the links 131 and 132 when the extension spring 125 acts to bend the links 131 and 132.

When the hose 20 is in a shape shown in FIG. 10(a) and before the high temperature and high pressure fluid is introduced, the links 122, 123, 124, 131 and 132 of the movable supporting tools 120, 130 are in an extended state against the tensile springs 125, 127, and 133 by rigidity of the hose 20 itself.

However, if the high temperature and high pressure fluid is introduced into the hose 20 to start bending the corrugated portions A, B and C, the biasing force of the tensile springs 125, 127, and 133 is applied to start bending the links 122, 123, 124, 131 and 132, and lastly, the links abut against the stoppers 126, 128 and 134, and further bending is restricted.

Therefore, the hose 20 is naturally bent by the high temperature and high pressure fluid introduced therein and by the action of the corrugated portions A, B and C, but the bending is restricted by the fixing and supporting tool 110 and the movable supporting tools 120 and 130, and the shape of the final product is constant.

After the hose 20 was bent into a constant shape in this manner, cold fluid such as water is introduced into the hose 20 like the previous embodiment to abruptly cool and harden the hose 20, the shape is fixed, and the flexion resin hose can be obtained.

It is preferable that conditions in the heating and pressurizing processes are higher than conditions higher than the highest temperature and pressure when the hose is used. For example, in the case of a radiator hose for an automobile, about 130° C. and 2 kg/cm² are the highest conditions, and if the hose is subjected to heating and pressurizing processes under conditions of 140° C. and 3 kg/cm², a hose capable of sufficiently withstand using conditions of the radiator hose. It is preferable that the heating temperature is a temperature equal to or higher than transition temperature of resin that is material of the hose, is a temperature before the flowing is started. The pressurizing pressure is preferable about 1.5 to 8 kg/cm², more preferably, 2.5 to 3.5 kg/cm².

Figure 12:
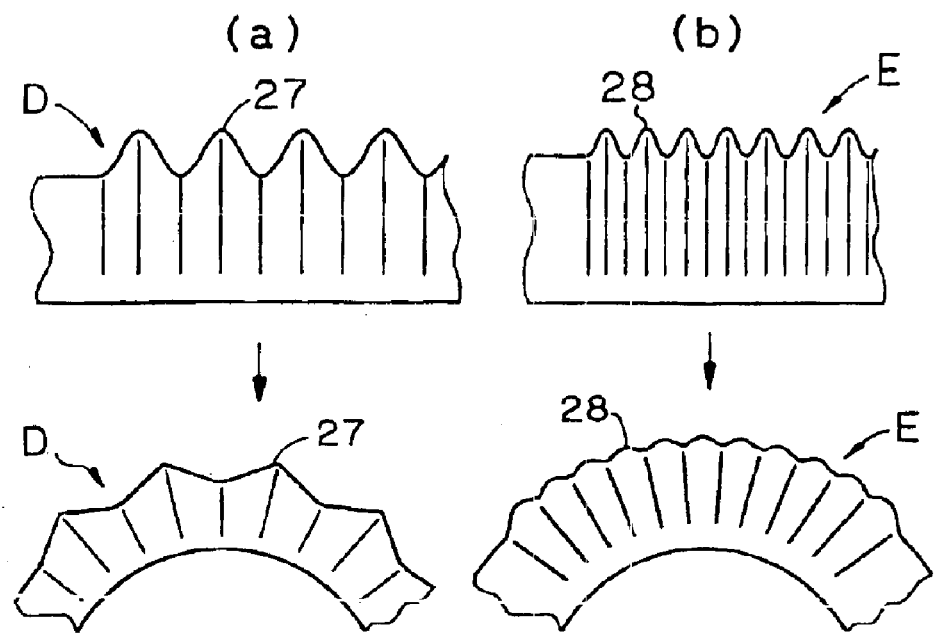
FIG. 12 are partial enlarged views showing a state in which corrugated portions having different shapes are bent.

FIG. 12 are partial enlarged views showing a state in which corrugated portions having different shapes are bent. That is, in a corrugated portion D shown in FIG. 12(a) and a corrugated portion E shown in FIG. 12(b), lengths of developed uneven portions 27 and 28 are the same, but a pitch of the uneven portion 27 of the corrugated portion D is greater than a pitch of the uneven portion 28 of the corrugated portion E. As a result, in the bent shapes shown below the corrugated portions, uneven portion outside the bent portion of the corrugated portion D is larger as compared with the corrugated portion E, and a resistance when inner fluid passes is greater.

Figure 13:
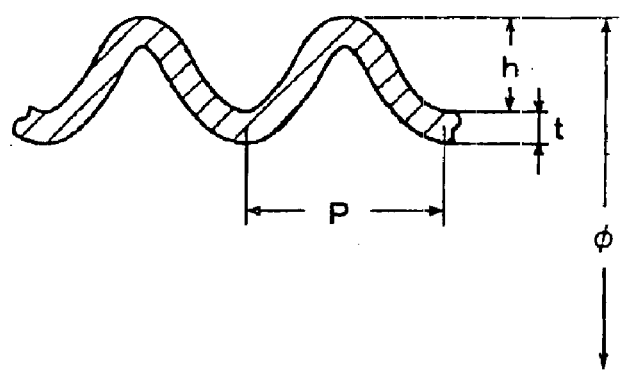
FIG. 13 is a partial enlarged sectional view showing a preferable example of the corrugated portion.

In view of such circumstances, in order to reduce the pressure loss of the inner fluid when the hose is bent, it is preferable that a pitch P of the corrugated portion shown in FIG. 13 is about 2 to 15 times, more preferably about 4 to 5 times of a thickness t of the hose, and a height h of a crest is about 1.5 to 15 times, and more preferably about 2 to 3 times of the thickness t of the hose. In terms of strength and workability, a diameter $\phi$ of the hose is preferably about 5 to 50 times of the thickness of the hose.

FIG. 14 show other examples of the corrugated portion having uneven characteristics in the circumferential direction with respect to the tensile strength in the axial direction in the hose used in the present invention.

In an example shown in FIG. 14(a), a corrugated portion comprising an uneven portion of the same height is formed on the entire circumferential direction. A thickness $t_1$ of the hose of a certain portion in the circumferential direction is thinner than a thickness $t_2$ of a portion opposed to the certain portion. In this example, the thinner thickness $t_1$ has a lower tensile strength and thus, this portion is easily elongated, and the hose is bent such that the portion thereof on the side of the thinner thickness $t_1$ comes outside.

In an example shown in FIG. 14(b), a corrugated portion having an uneven portion over the entire circumferential direction. A height $h_1$ of the hose of a certain portion in the circumferential direction is lower than a height $h_2$ of a portion opposed to the certain portion. In this example, the higher height $h_2$ has a lower tensile strength and thus, this portion is easily elongated, and the hose is bent such that the portion thereof on the side of the higher height $h_2$ comes outside.

In an example shown in FIGS. 14(c) and (c'), a corrugated portion having an uneven portion over the entire circumferential direction. A cross section shape of the uneven portion of a certain portion (upper portion in the drawings) is of smooth waveform, but a cross section of the uneven portion of a portion opposed to the certain portion is of π-shape. FIG. 14(c) is a partial sectional view and FIG. 14(c') is a partial perspective view. In this example, the portion of the hose having the π-shape cross section has a longer developed length and lower tensile strength in the axial direction and easily elongated. Therefore, the hose is bent such that this portion having the π-shape cross section comes outside.

In an example shown in FIGS. 14(d) and (d'), a corrugated portion having uneven portions that is divided into two from two portions opposed to each other in the circumferential direction is formed. A pitch of one of the uneven portions (upper one in the drawings) is as great as two times of a pitch of the other uneven portion (lower one in the drawings). That is, the other uneven portion has two times unevenness of the one uneven portion per unit length. FIG. 14(c) is a sectional view taken along a surface perpendicular to an axis, and FIG. 14(c') is a partial perspective view. In this example, the lower uneven portion having narrow pitch has a long developed length and a lower tensile strength and thus, this portion is easily elongated, and the hose is bent such that the lower uneven portion comes outside.

In an example shown in FIG. 14(e), pitches of unevenness of the corrugated portion are different between a lower portion and an upper portion thereof. The pitch of the upper unevenness is narrower and the pitch of the lower unevenness is wider. As a result, if the upper and lower unevenness are compared with each other, the upper developed length is longer per unit area, a lower tensile strength in the axial direction is low and thus, this portion is easily elongated, and the hose is bent such that the upper uneven portion comes outside.

As described above, as corrugated portions having uneven characteristics in the circumferential direction with respect to the tensile strength in the axial direction, corrugated portion having various shapes can be employed.

Figure 15:
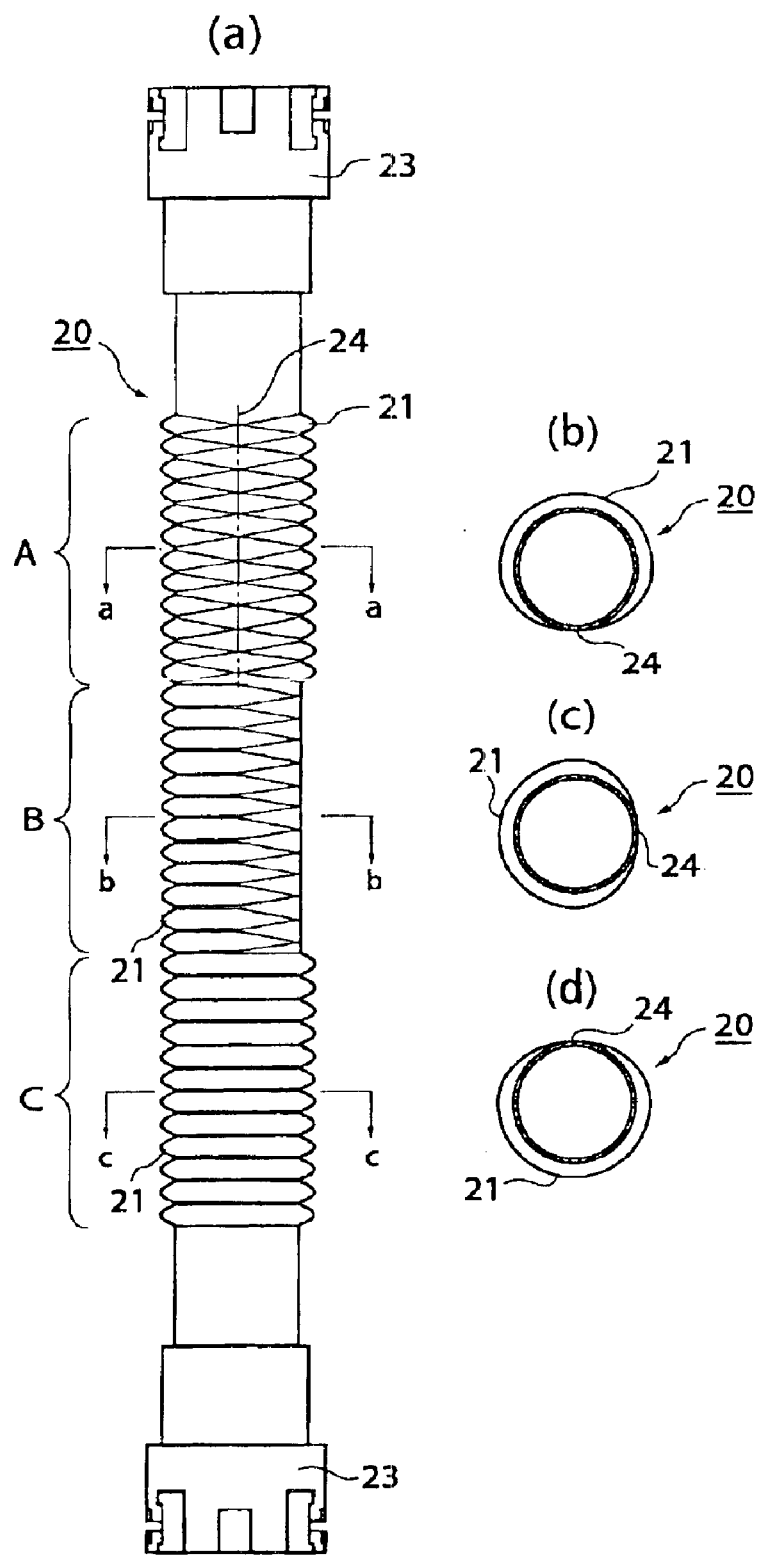
FIG. 15 are views for explaining another example of the hose to which the producing method of the invention is applied.
Figure 16:
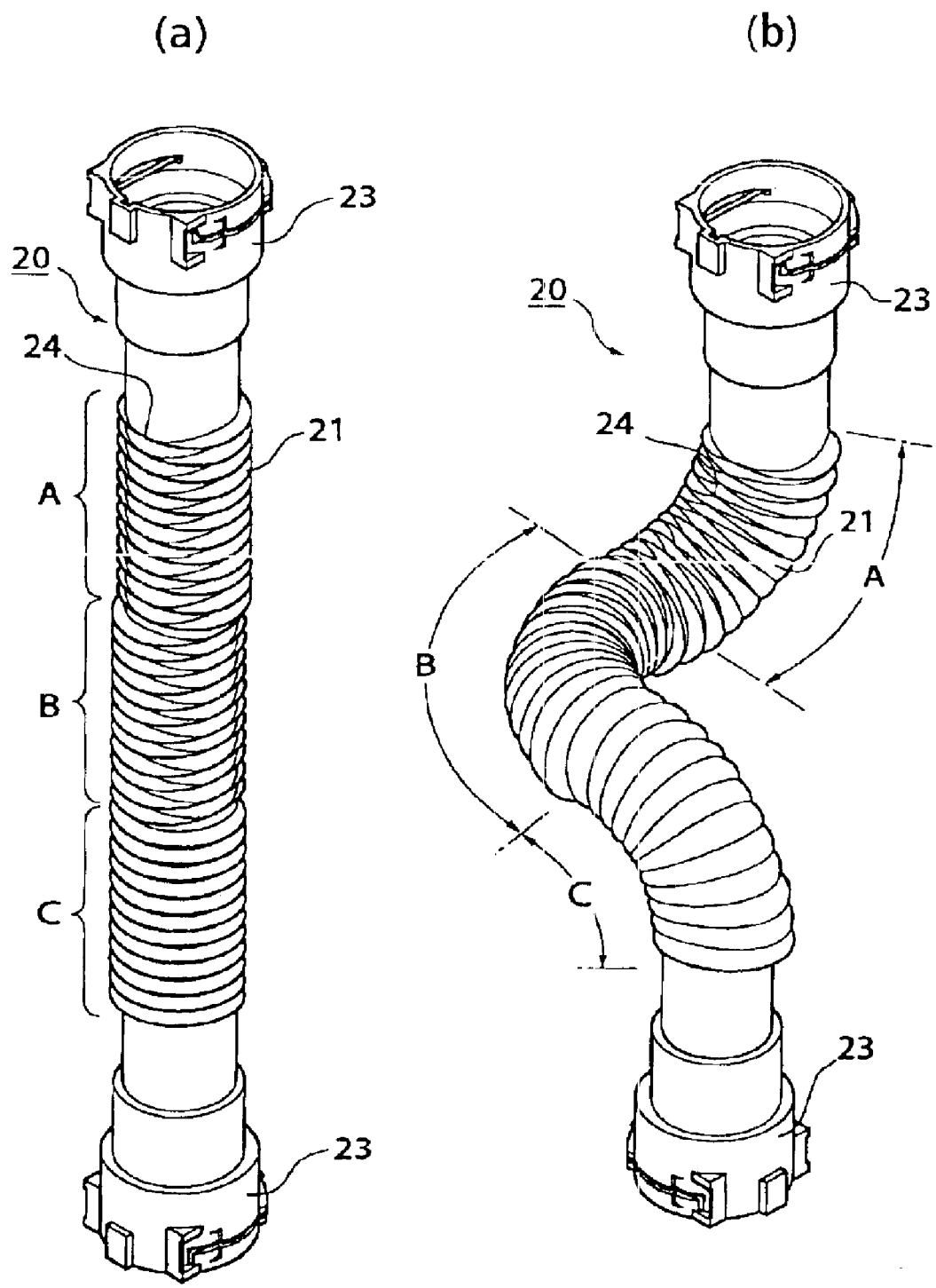
FIG. 16 are perspective views of the hose.

FIGS. 15 and 16 show another example of the hose to which the producing method of the invention is applied. FIG. 15 is a front view of the hose, FIG. 15(a) is a sectional view taken along arrows a—a, FIG. 15(b) is a sectional view taken along arrows b—b, and FIG. 15(c) is a sectional view taken along arrows c—c. FIG. 16 are perspective views, wherein FIG. 16(a) shows a state before bending, and FIG. 16(b) shows a state after bending.

This flexion resin hose 20 is provided at its opposite ends with the adapters 23 and 23, and is formed at its intermediate portion with a corrugated portion 21 having a waveform cross section along its axial direction. In this corrugated portion 21, a portion thereof in the circumferential direction is not formed with no crest, and its height is the same as that of a portion of the hose 20 where there is no corrugated portion. This no crest portion 24 has three regions A, B and C arranged for a predetermined length along the axial direction of the hose 20. As shown in FIGS. (a), (b) and (c), a direction of the no crest portion 24 is deviated through 90° each.

The no crest portion 24 has strong tensile strength in the axial direction with respect to the portion of the hose 20 where the corrugated portion 21 is formed. Therefore, if this hose 20 is heated and pressurized, the corrugated portion 21 is relatively elongated greatly with respect to the no crest portion 24. Thus, it is possible to curve this portion such that the no crest portion 24 comes inside. Since the no crest portion 24 has three regions A, B and C having different directions, the bending direction is changed in each the region. Thus, the obtained shape is bent three-dimensionally.

Figure 17:
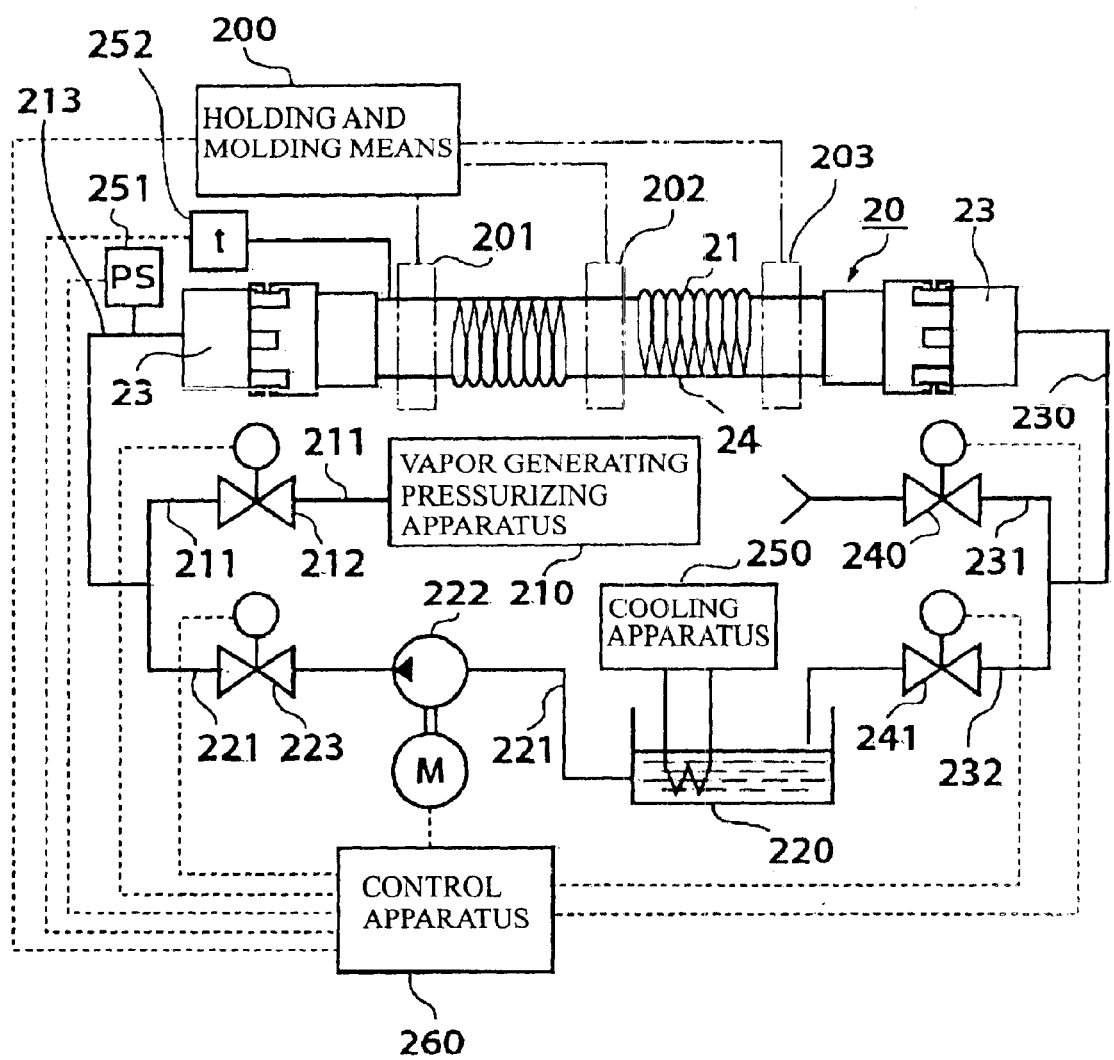
FIG. 17 is a schematic block diagram of an apparatus for heating, pressurizing and bending a resin hose.

FIG. 17 schematically shows a structure of an apparatus for heating, pressurizing and bending such a resin hose 20.

In this example, the hose 20 is held by holding portions 201, 202 and 203 of a holding molding means 200. In the case of this embodiment, as will be described later, the holding portion 201 is previously fixed, and the holding portions 202 and 203 are waiting jigs disposed on predetermined positions in accordance with a bent shape when the hose 20 is heated and pressurized.

A vapor generating pressurizing apparatus 210 is connected to the adapter 23 on the one end of the hose 20 through a line 211 provided at its intermediate portion with a first solenoid valve 212 and a line 213. A water tank 220 is also connected to the adapter 23 on the one end of the hose 20 through a pump 222, a line 221 provided at its intermediate portion with a second solenoid valve 223 and the line 213. A pressure gauge 251 is connected to the line 213. A thermometer 252 for detecting a temperature of the hose 20 is disposed.

The adapter 23 on the other end of the hose 20 is connected to a line 230. The line 230 is branched into a line 231 provided at its intermediate portion with a third solenoid valve 240, and a line 232 provided at its intermediate portion with a fourth solenoid valve 241. The line 232 is introduced into the water tank 220, and a cooling apparatus 250 is disposed in the water tank 220.

The pressure gauge 251, the thermometer 252, the first to fourth solenoid valves 212, 223, 240 and 241 and the holding molding means 200 are connected to a control apparatus 260 so that the control apparatus 260 can adjust the working procedure, a pressure, a temperature and the like.

FIG. 18 show a concrete structure of the holding and molding means. In this embodiment, the holding and molding means 200 comprising the first holding portion 201 disposed on a base 270, the second holding portion 202 and the third holding portion 203. The first holding portion 201 has a clamper 271 for clamping the hose 20 in an opening and closing manner. The second holding portion 202 includes a waiting jig 273 fixed through a support member 272. The waiting jig 273 is disposed on a bending path expected when the hose 20 is heated, pressurized and bent, and comprises a U- or V-shaped member whose tip end is opened so as to receive the hose 20. The third holding portion 203 also has a waiting jig 275 fixed through a support member 274 and having the same shape as that described above.

As shown in FIG. 18(a), the hose 20 is disposed on the base 270 in a state in which one end of the hose 20 is held by the first holding portion 201. As shown in FIG. 18(b), a pipe of the line 213 is connected to the adapter 23 on the one end of the hose 20, and a pipe of the line 230 is connected to the adapter 23 on the other end of the hose 20. In this state, high temperature and high pressure fluid is allowed to flow in the hose 20 to heat and pressurize the latter, since the corrugated portion 21 is relatively largely elongated with respect to the no crest portion 24, the hose 20 is bent by itself. As a result, the hose 20 is fitted into the waiting jig 273 of the second holding portion 202 and the waiting jig 275 of the third holding portion 203, and the hose 20 is held at that position and formed into a predetermined shape.

Figure 19:
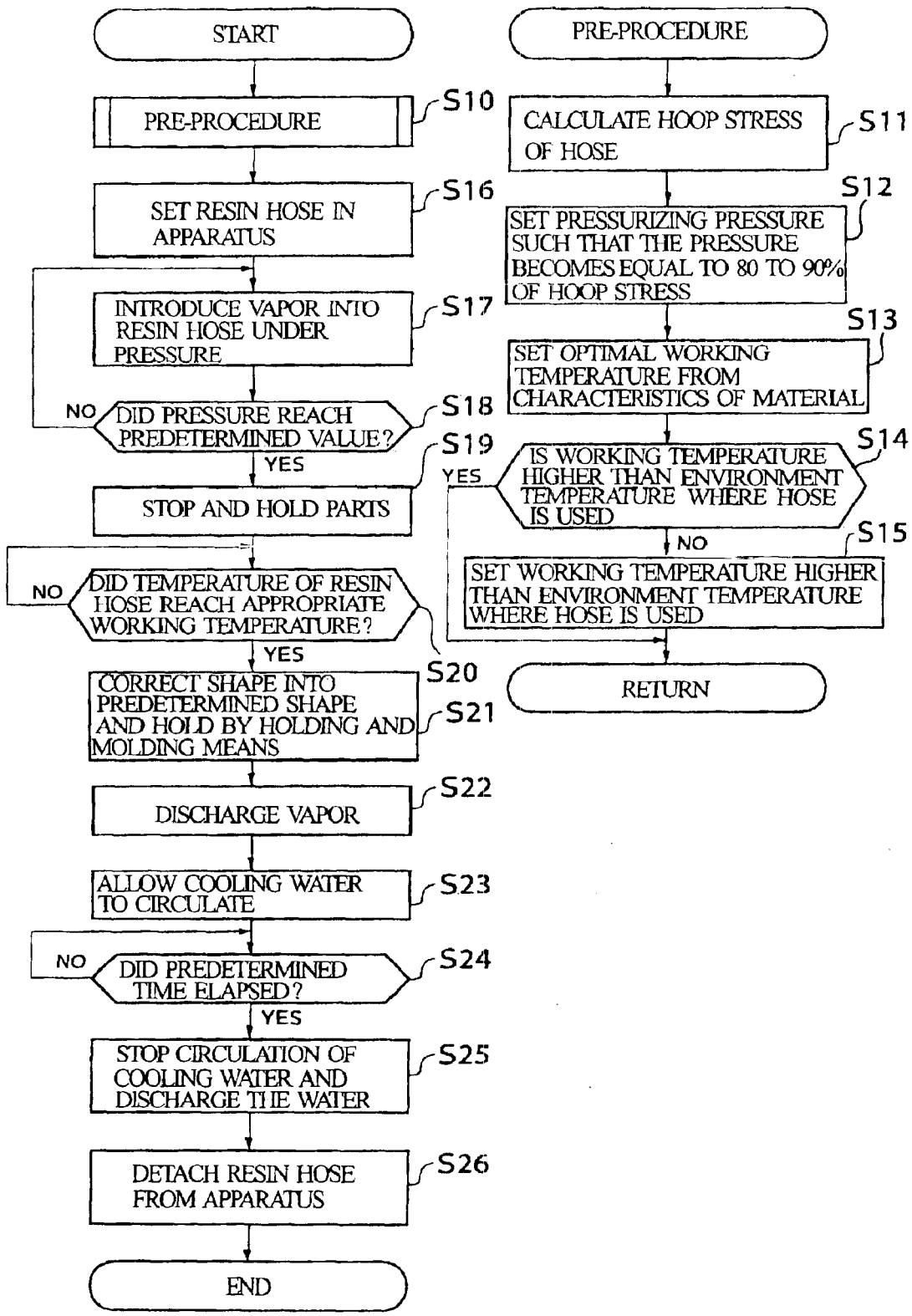
FIG. 19 are flowcharts for a working process of the hose.

FIG. 19 shows a flowchart of the working procedure of the hose 20.

Along the flow (A), as pre-procedure (step S10) first, appropriate values of a pressure and a temperature by the flow (B). That is, data concerning material and shape of the applied hose 20 are input to the control apparatus 260 to calculate hoop stress of the hose 20 (step S11). Then, the pressurizing pressure is set to be 80 to 90% of the hoop stress (step S12). An optimal working temperature is set from characteristics of material (step S13). Next, it is judged whether the working temperature is higher than that in the environment where the hose 20 is used (step S14). It YES, the control apparatus 260 is set such that the pressurizing pressure and working temperature become equal to those obtained in the steps S12 and S13, and the procedure is completed. If the working temperature is lower than that in the environment where the hose 20 is used, the working temperature is set higher than that in the environment where the hose 20 is used ((step S15), the control apparatus 260 is set such that the pressurizing pressure and working temperature become equal to those obtained in the steps S12 and S15, and the procedure is completed.

Next, one end of the hose 20 is held by the first holding portion 201 of the bending apparatus, and the hose 20 is set (step S16).

Figure 20:
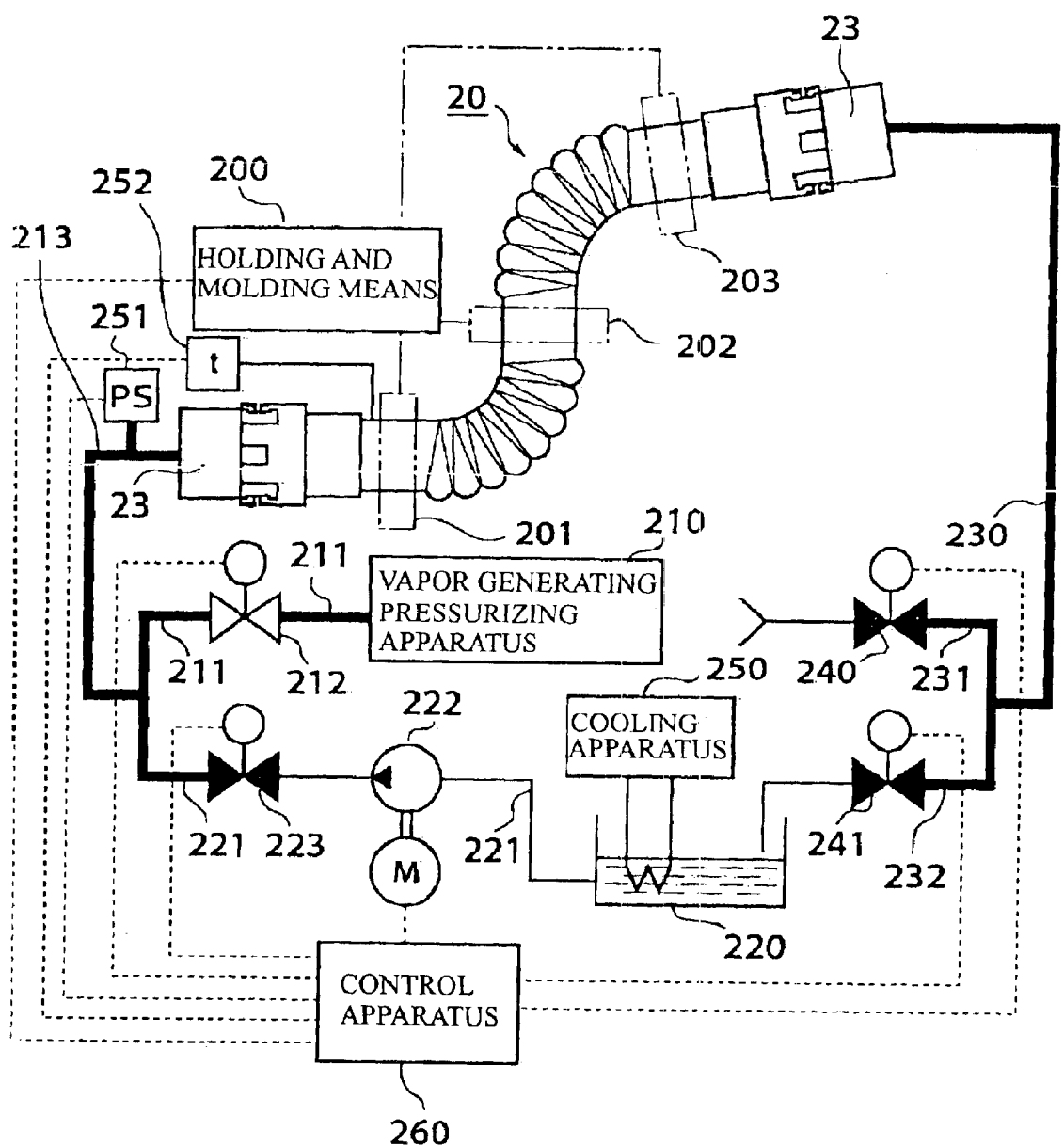
FIG. 20 is a view for explaining a freely bending process.

Then, as shown in FIG. 20, in a state in which the second to fourth solenoid valves 223, 240 and 241 are closed, the first solenoid valve 212 is opened, and heated and pressurized vapor is introduced into the hose 20 from the vapor generating pressurizing apparatus 210 through the lines 211 and 213 (step S17). Thick lines in FIG. 20 indicates paths in which vapor is charged. A pressure of the vapor introduced into the hose 20 is measured by the pressure gauge 251, and a measured result is sent to the control apparatus 260. Similarly, a heating temperature of the hose 20 is measured by the thermometer 252, and a measured result is sent to the control apparatus 260. The corrugated portion 21 is elongated by heating and pressurizing treatment, whereas the no crest portion 24 has strong tensile strength in the axial direction. Therefore, bending of the hose 20 is started. At that time, the second holding portion 202 and the third holding portion 203 do not restrain the hose 20, and the hose 20 is freely bent.

Next, the control apparatus 260 judges whether a pressure reached a predetermined pressure set by the flow B based n the measured result of the pressure gauge 251 (step S18). If NO, the flow returns to step S17 to keep introducing the heated and pressurized vapor.

If the pressure reached the predetermined pressure (YES), the hose 20 is fitted to the second holding portion 202 and the third holding portion 203, a deformation of the hose 20 is stopped, and the hose is held in its constant shape (step S19).

The control apparatus 260 judges whether a temperature of the hose 20 reached the optimal working temperature set by the flow B based on the measured result of the thermometer 252 (step S20). If NO, the hose 20 is kept being heated and pressurized until the temperature of the hose 20 reaches the working temperature.

Figure 21:
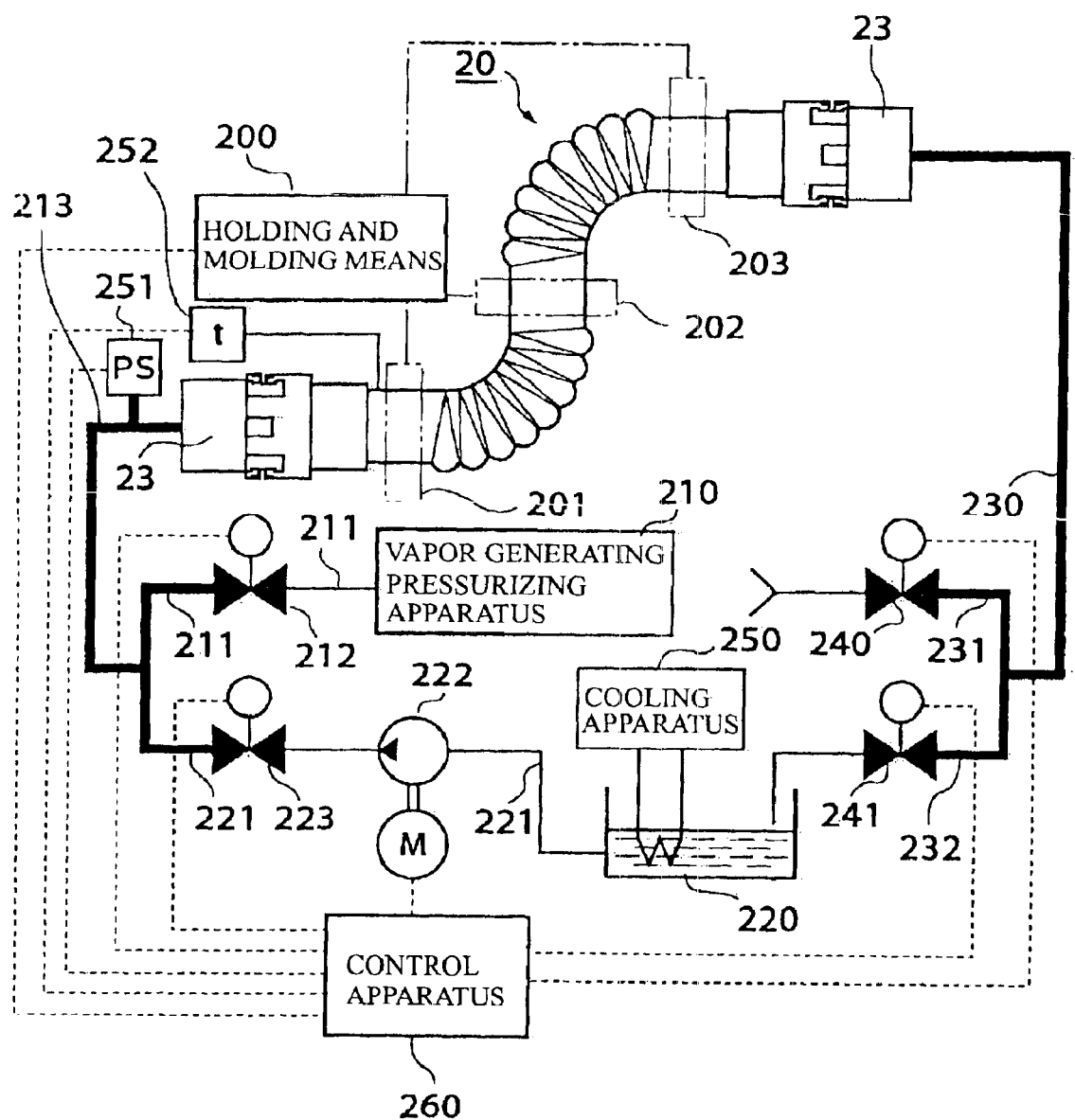
FIG. 21 is a view for explaining a holding and forming process.

If the temperature of the hose 20 reached the working temperature (YES), as shown in FIG. 21, all of the first to fourth solenoid valves 212, 223, 240 and 241 are closed, and this state is maintained for a predetermined time (step S21).

Figure 22:
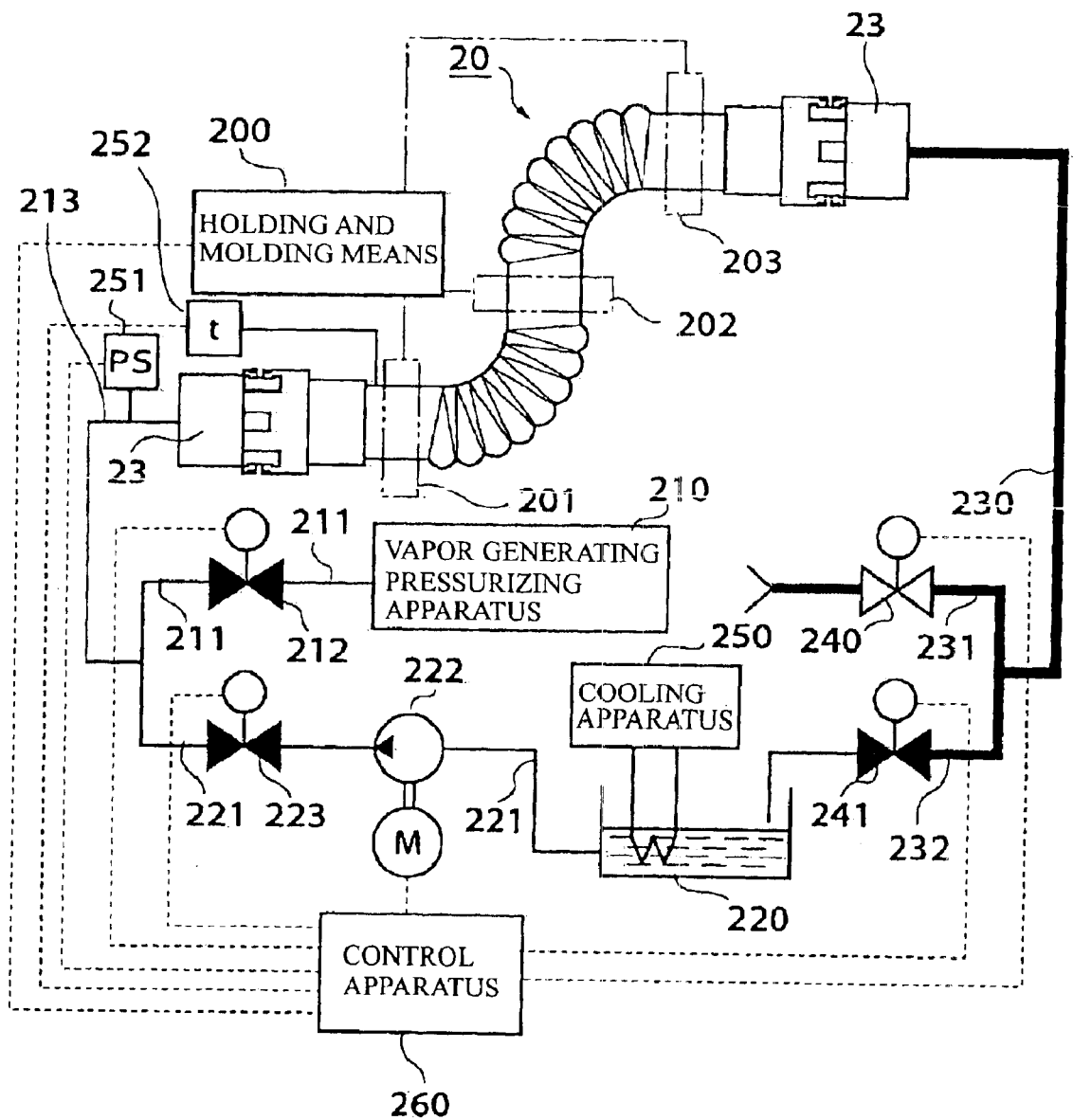
FIG. 22 is a view for explaining a vapor discharging process.

Next, as shown in FIG. 22, only the third solenoid valve 240 is opened to discharge vapor in the hose 20 (step S22). At that time, the first to third holding portions 201, 202 and 203 keep holding the hose 20 in its predetermined shape.

Figure 23:
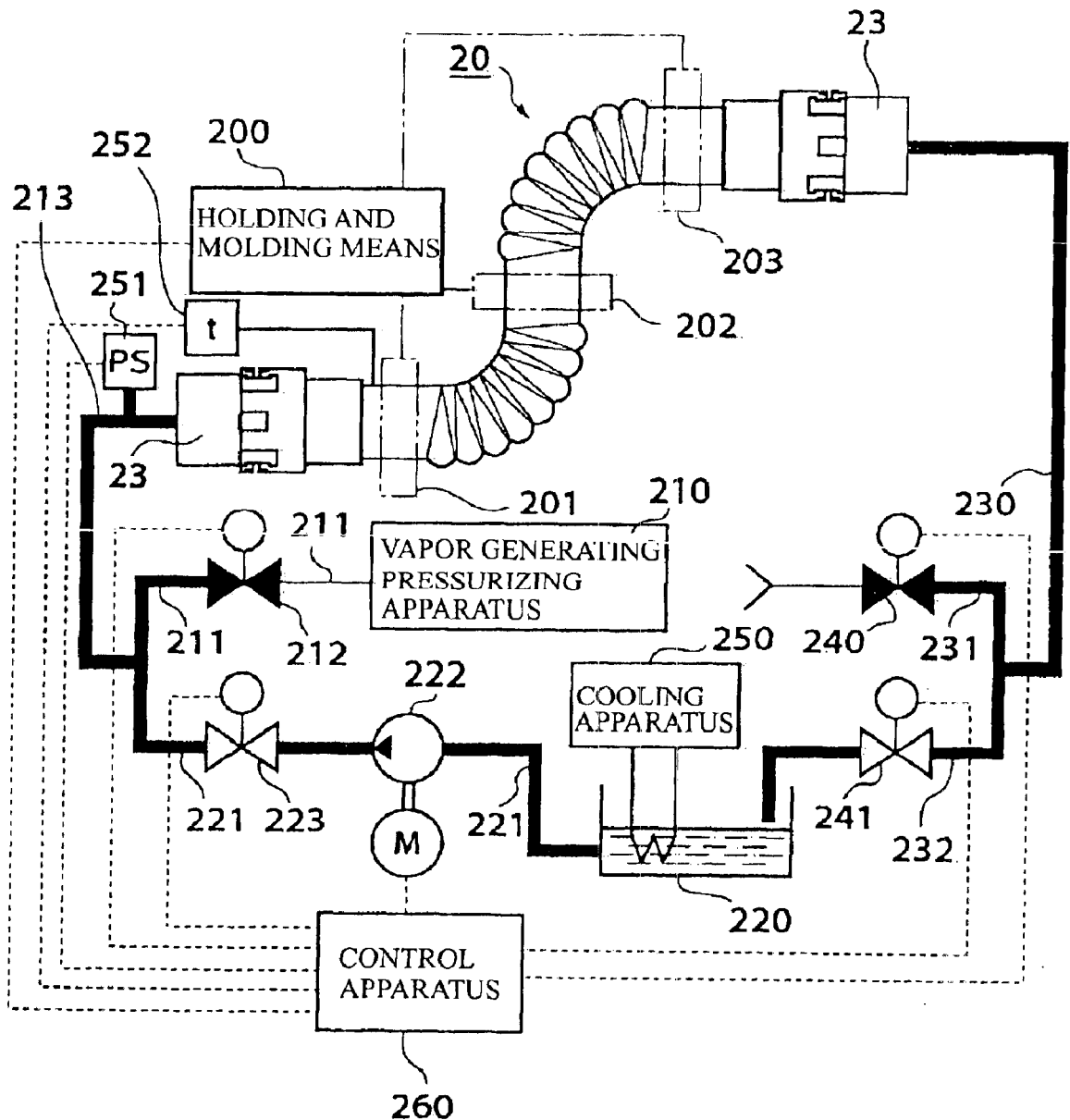
FIG. 23 is a view for explaining a cooling process.

Then, as shown in FIG. 23, the first and third solenoid valves 212 and 240 are closed, the second and fourth solenoid valves 223 and 241 are opened, and the pump 222 is actuated to introduce water in the water tank 220 into the hose 20 through the lines 221 and 213, and the cold water is circulated through the hose 20 (step S23). The cold water that has passed through the hose 20 is returned into the water tank 220 through the lines 230 and 232, and cooled by the cooling apparatus 250 and sent out into the hose 20 again. Since the hose 20 is held by the first to third holding portions 201, 202 and 203, the shape of the hose 20 is prevented from returning by the cooling operation.

The control apparatus 260 judges whether a predetermined cooling process time has been elapsed (step S24), and if NO, the cooling process is continued, and if YES, the solenoid valve 223 is closed to discharge the cooling water in the hose 20 into the water tank 220 through the lines 230 and 232 (step S25).

Lastly, the hose 20 is detached from the bending apparatus, and the working procedure is completed (step S26).

Figure 24:
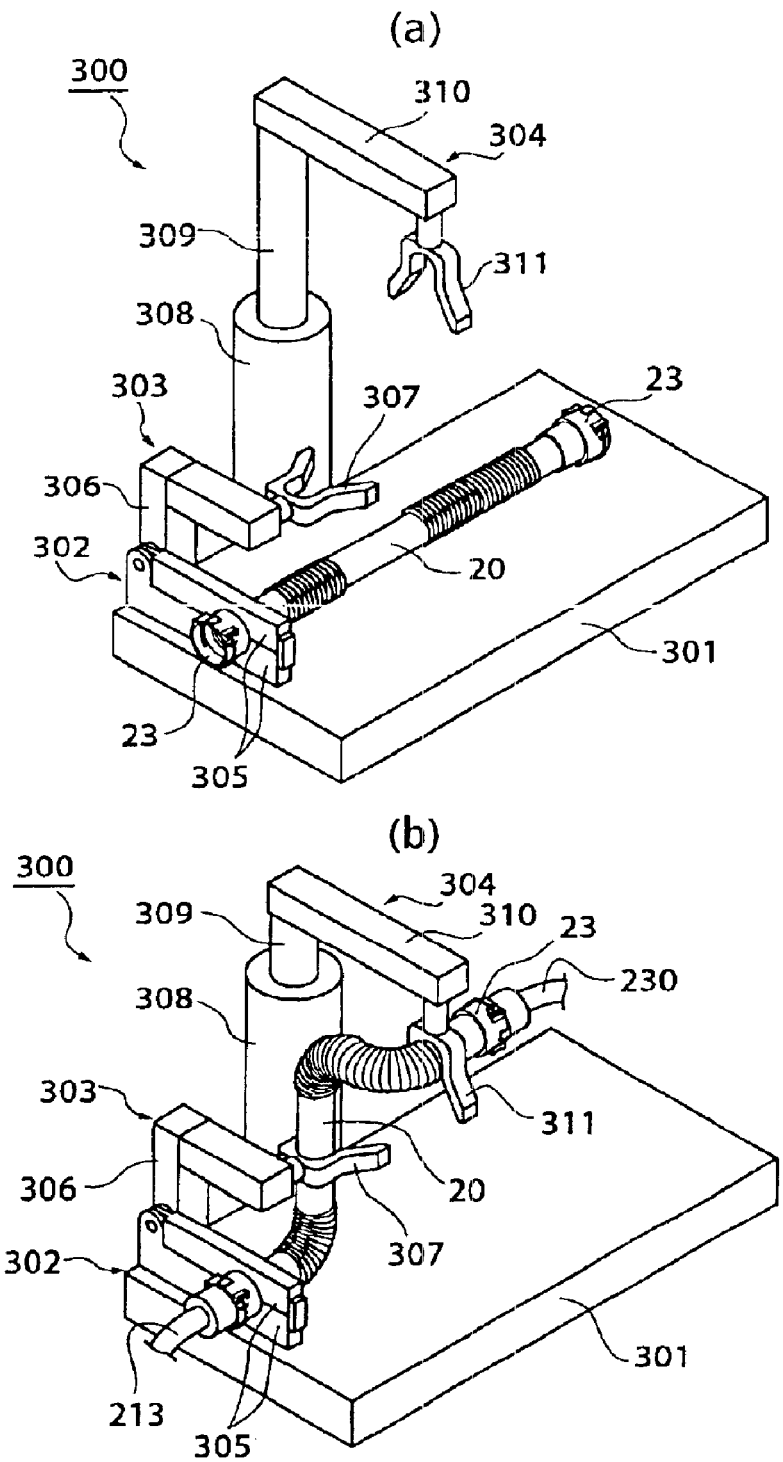
FIG. 24 are perspective views showing another example of the holding and molding means used in the invention.

FIG. 24 show another example of the holding and molding means.

This holding and molding means 300 includes a first holding portion 302 disposed on a base 301, a second holding portion 303 and a third holding portion 304. The first holding portion 302 includes a clamper 305 for holding one end of the hose 20 in an opening and closing manner. The second holding portion 303 includes a support member 306 rising in a reversed L-shape, and a waiting jig 307 whose tip end is opened in U- or V-shape. The third holding portion 304 includes a cylinder 308 rising on the base 301, a slide shaft 309 that can be vertically moved by the cylinder 308, an arm 310 extending horizontally from an upper end of the slide shaft 309, and a waiting jig 311 suspended downward from the arm 310 and having a tip end that is opened In U- or V-shape.

As shown in FIG. 24(a), according to this holding and molding means 300, when the hose 20 is set or the hose 20 is heated, pressurized and freely bent, the slide shaft 309 is projected upward by the cylinder 308, the wait jig 311 is allowed to wait upward so as to prevent the jig 311 from hindering the operation or from hindering the freely bending operation of the hose 20. If the pressure and the temperature of the hose 20 reached the predetermined values, and the hose 20 approached the target bent shape, as shown in FIG. 24(b), the cylinder 308 is again operated to lower the slide shaft 309 and to lower the wait jig 311. As a result, the hose 20 is fitted into the wait jig 311 and thereafter, the shape of the hose 20 is fixed and thus, the final bending shape of the hose 20 can be determined constantly.

Figure 25:
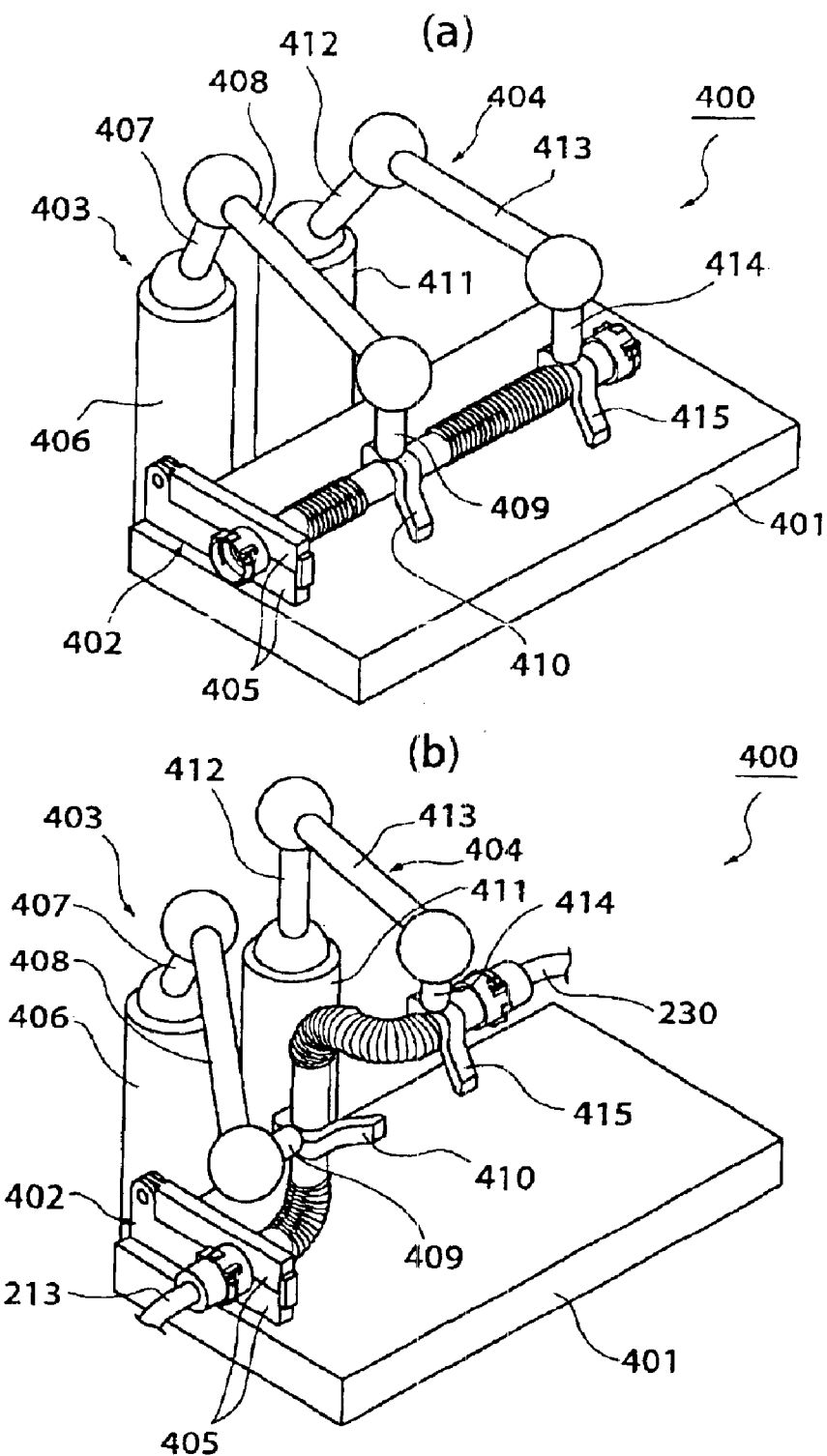
FIG. 25 are perspective views showing another example of the holding and molding means used in the invention.

FIG. 25 show another example of the holding and molding means used in the present invention. FIG. 25(a) shows a state before working, and FIG. 25(b) shows a state after working.

This holding and molding means 400 includes a first holding portion 402 disposed on a base 401, a second holding portion 403 and a third holding portion 404. The first holding portion 402 includes a clamper 405 for holding one end of the hose 20 in an opening and closing manner.

The second holding portion 403 includes a post 406, three links 407, 408 and 409 connected to one another through universal joints from an upper end of the post 406, and a holder 410 mounted to a tip end of the link 409. A tip end of the holder 410 is opened into U- or V-shape, and the holder 410 is resiliently fitted to an outer periphery of the hose 20 to detachably hold the hose 20.

Similarly, the third holding portion 404 includes a post 411, three links 412, 413 and 414 connected to one another through universal joints from an upper end of the post 411, and a holder 415 mounted to a tip end of the link 414. A tip end of the holder 415 is opened into U- or V-shape, and the holder 410 is resiliently fitted to an outer periphery of the hose 20 to detachably hold the hose 20.

The links 407, 408 and 409 of the second holding portion 403, and the links 412, 413 and 414 of the third holding portion can freely be bend in accordance with the bending operation of the hose 20 when the hose 20 is freely bent. If a pressure and a temperature reached the predetermined value and the hose 20 approached the target bending shape, the holders 410 and 415 are moved to predetermined positions and maintained in that state.

Figure 26:
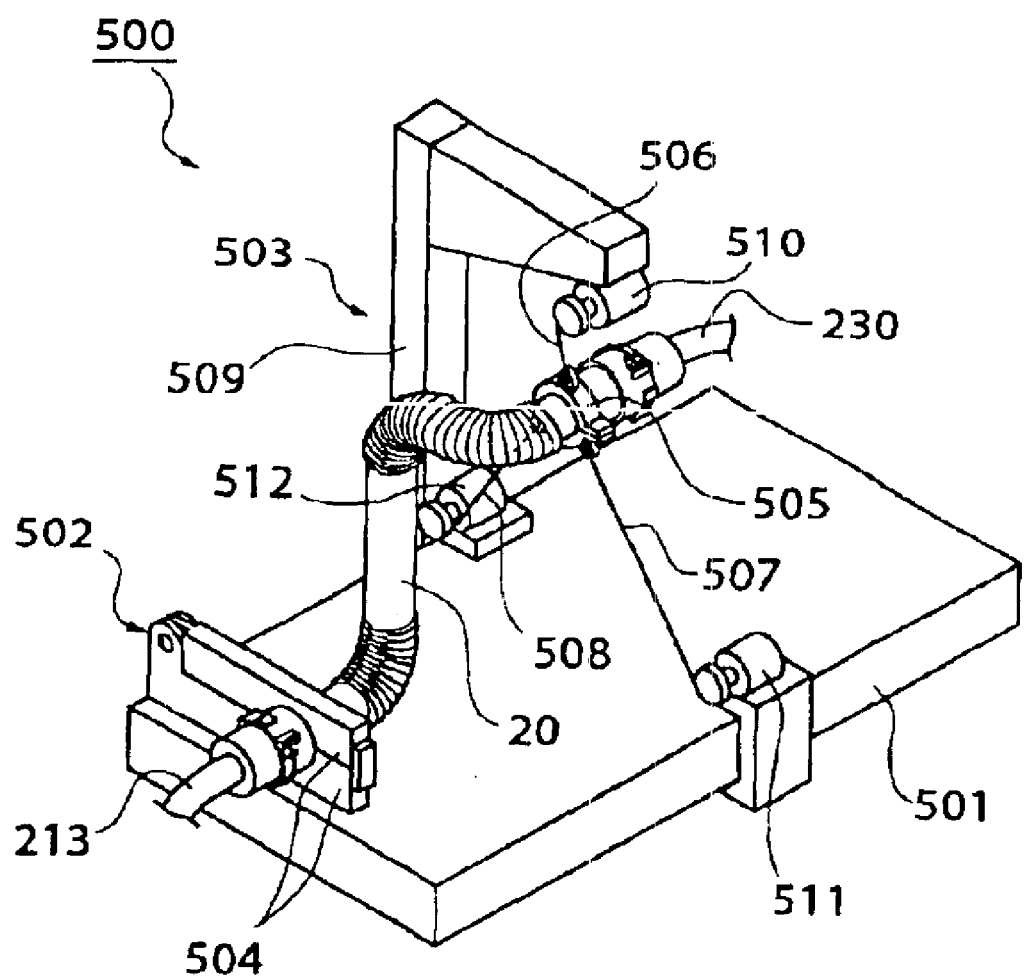
FIG. 26 is a perspective view showing another example of the holding and molding means used in the invention.

FIG. 26 shows another example of the holding and molding means used in the present invention. FIG. 26(a) shows a state before working, and FIG. 26(b) shows a state after working.

This holding and molding means 500 includes a first holding portion 502 and a second holding portion 503 disposed on a base 501. The first holding portion 502 includes a clamper 504 for holding one end of the hose 20 in an opening and closing manner.

The second holding portion 503 includes an annular holder 505 for holding the hose 20 in an opening and closing manner. This annular holder 505 is supported by three wires 506, 507 and 50B. The wire 506 is connected to a driving pulley of a motor 510 mounted to a tip end of a support member 509 rising on the base 501 in a reversed L-shape form. The wire 507 is connected to a driving pulley of a motor 511 secured to one side of the base 501. Similarly, the wire 508 is connected to a driving pulley of a motor 512 secured to a side of the base 501 opposed to the former side. The rotation of the motors 510, 511 and 512 can be controlled for example, and can loose and pull the wires 506, 507 and 508 to obtain predetermined lengths.

According to this holding and molding means 500, when the hose 20 is in its freely bent state, the wires 506, 507 and 508 are loosened so that the wires can freely be bent in accordance with the bending motion of the hose 20, and if the pressure and the temperature reached predetermined values and the hose 20 approached the target bending shape, the motors 510, 511 and 512 are actuated to pull the three wires 506, 507 and 508 such that their lengths become the predetermined lengths, and the holder 505 is supported on a predetermined position through the wires 506, 507 and 508. As a result, the shape of the hose 20 is fixed and thus, the final bending shape of the hose can be determined constantly.

Figure 27:
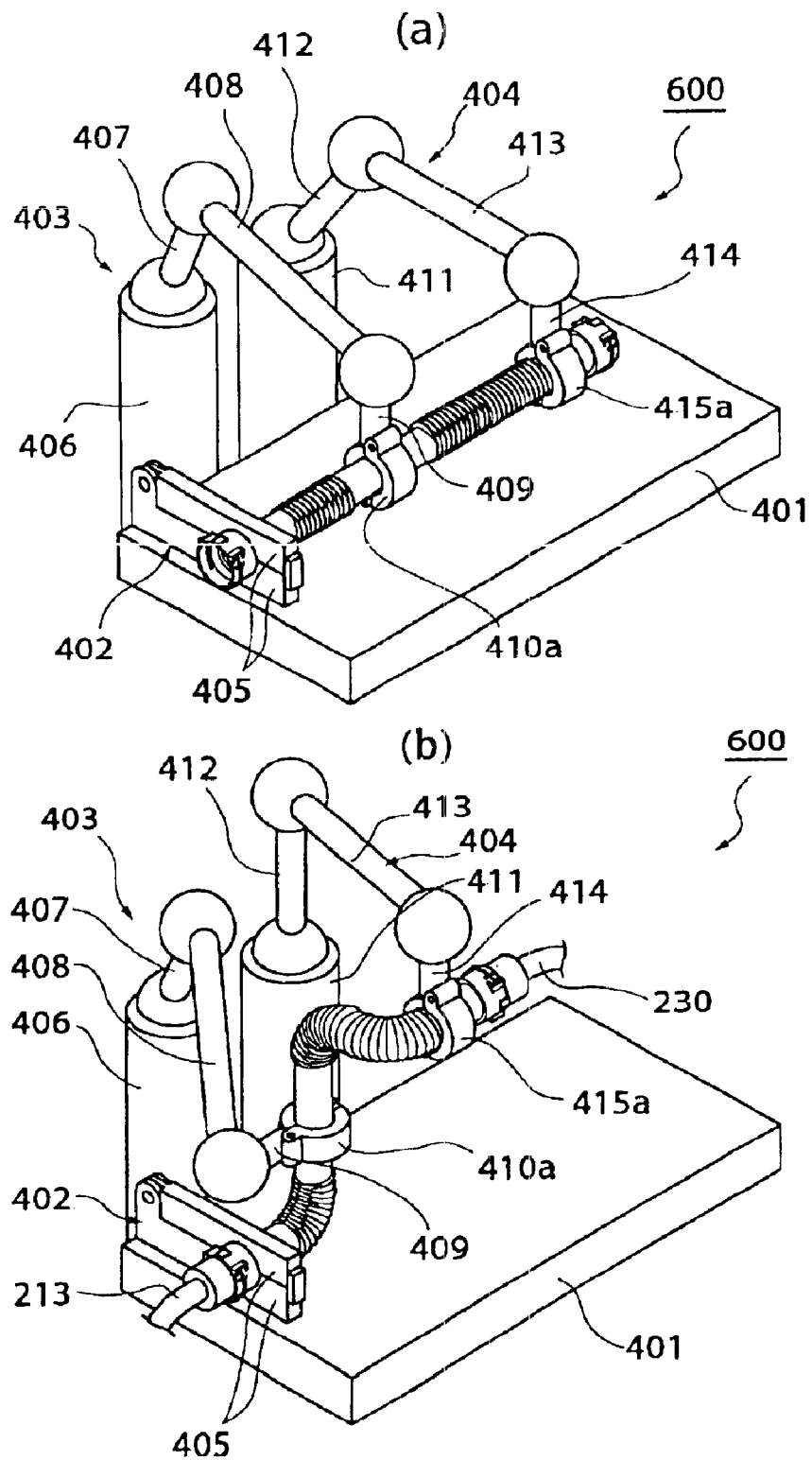
FIG. 27 are perspective views showing another example of the holding and molding means used in the invention.

FIG. 27 shows another example of the holding and molding means used in the present invention. FIG. 27(a) shows a state before working, and FIG. 27(b) shows a state after working.

This holding and molding means 600 has the basically the same structure as the holding and molding means 400 shown in FIG. 25, but a clamper 410a is used instead of the second holding portion 403, and a clamper 415a is used instead of the holder 415 shown in FIG. 25.

In the holding and molding means 600, three links 407, 408 and 409 of the second holding means 403, and three links 412, 413 and 414 of the third holding means 404 are moved by control means and driving means (both not shown).

That is, one end of the hose 20 is held by the clamper 405 of the first holding portion 402, and an intermediate portion is held by the clamper 410a of the second holding portion 403, and the other end is held by the clamper 415a of the third holding portion. In this state, when the hose 20 is bent by heating and pressurizing the latter, the hose 20 is bent by the pressure, and in synchronization with this or slightly thereafter, the links are moved, and the clappers 410a and 415a are moved along predetermined paths set in accordance with the target hose shape, thereby making it possible to bent the hose 20 swiftly.

In this case, examples of method for moving the clampers 410a and 415a are: 1) a method in which the clampers are moved at a predetermined speed along the predetermined path to preset positions sequentially in accordance with time elapsed after the heating and pressurizing operation was started, 2) a method in which the clampers are moved along the predetermined path while controlling the moving speed such that a load applied to each link reaches a predetermined value.

By controlling the movements of the clampers 410a and 415a, it is possible to enhance the working speed, and to improve the bending precision to an extremely high level. Further, internal residue stress of resin of the hose 20 can be lowered to an extremely low level while maintaining the characteristics of the freely bending method.

As described above, various structures can be employed for the holding and molding means.

INDUSTRIAL APPLICABILITY

As explained above, according to the present invention, it is possible to heat the hose within a short time by flowing high temperature fluid into the hose, and it is possible to cool and harden the hose within a short time by flowing cold temperature fluid into the hose after the hose was bent. Therefore, the flexion resin hose can be produced with excellent productivity and high precision.

According to another embodiment of the invention, the hose is bent while pressurizing an interior of the hose by high temperature fluid and blowing cooling fluid onto the neutral line along the bending of the hose. Therefore, buckling of the hose is prevented, and the hose can be bent while keeping a cross section thereof close to a circle.

According to another embodiment of the invention, the a hose having a corrugated portion of uneven characteristics in its circumferential direction with respect to tensile strength in the axial direction is used. High temperature and high pressure fluid is allowed to flow into the hose, and the latter is heated and pressurized. With this operation, it is possible to bend the hose into a predetermined shape even if a mold or jig is not used to forcibly bend the hose.

In this case, the hose is freely bent at an initial state by the heating and pressurizing procedure, and if the pressure or the heating temperature reached predetermined value, the bending shape of the hose is controlled by the holding and molding means so that a shape that is finally obtained can be determined constantly.

Further, in a preferable embodiment, if vapor is used as the high temperature fluid and water is used as the cold temperature fluid, since thermal conductivity is excellent, it is possible to heat and cool the hose within a shorter time, and it is possible to enhance the bending precision and the productivity, and the cleaning effect can also be expected.

I claim:

1. A method for producing a flexion resin hose, comprising a first step of allowing a high temperature fluid to flow into a hose made of thermoplastic resin to thereby heat said hose, a second step of bending said heated hose while blowing cooling fluid onto a neutral line along a bent portion of said hose, and a third step of allowing a cold temperature fluid into said hose to thereby cool and harden said hose.

2. A method for producing a flexion resin hose, comprising a first step of allowing a high temperature fluid to flow into a hose made of thermoplastic resin to thereby heat said hose, a second step of restricting the flow of said high temperature fluid downstream of said hose to pressurize an interior of said hose, a third step of bending said heated hose, and a fourth step of allowing a cold temperature fluid into said hose to thereby cool and harden said hose.

3. A method for producing a flexion resin hose in which said hose is made of thermoplastic resin, wherein said hose is provided in portion in its axial direction with a corrugated portion, said corrugated portion having uneven characteristics in its circumferential direction with respect to tensile strength in an axial direction thereof, said method further comprising a heating and pressurizing step for allowing high temperature and high pressure fluid into said hose to heat and pressurize said hose and for bending said corrugated portion of said hose by an internal pressure, and a cooling step for allowing cold temperature fluid into said hose to thereby cool and harden said hose.

4. A method for producing a flexion resin hose according to claim 3, wherein said hose is held by a first and a second holding tool located at a predetermined distance from each other, and wherein said heating and pressurizing step and said cooling step are carried out such that at least one of said first and said second holding tools can be displaced with respect to the other one.

5. A method for producing a flexion resin hose according to claim 3, wherein said hose is formed at a plurality of portions in its axial direction with corrugated portions, and an uneven characteristic in said circumferential direction of said corrugated portion is determined for each of said plurality of corrugated portions.

6. A method for producing a flexion resin hose according to claim 3, wherein said heating and pressurizing step is carried out using an internal pressure of 80 to 90% of the hoop stress.

7. A method for producing a flexion resin hose according to claim 3, wherein said heating and pressurizing step is carried out at a temperature higher than a temperature in an environment wherein said hose is to be used.

8. A method for producing a flexion resin hose according to claim 3, wherein said hose is formed from polyamide, and said heating and pressurizing step is carried out at 130 to 140° C. and 2.7 to 3.7 atmospheric pressure.

9. A method for producing a flexion resin hose according to claim 3, wherein said hose is formed from polypropylene, and said heating and pressurizing step is carried out at 110 to 130° C. and 2.2 to 3.0 atmospheric pressure.

* * * * *